(12) United States Patent
Wachter

(10) Patent No.: US 9,703,471 B2
(45) Date of Patent: Jul. 11, 2017

(54) SELECTIVELY COORDINATED AUDIO PLAYER SYSTEM

(71) Applicant: D&M Holdings, Inc., Kanagawa (JP)

(72) Inventor: Martin Richard Wachter, Phoenix, MD (US)

(73) Assignee: D&M Holdings, Inc., Kanagawa (JP)

( * ) Notice: Subject to any disclaimer, the term of this patent is extended or adjusted under 35 U.S.C. 154(b) by 9 days.

(21) Appl. No.: 14/441,047

(22) PCT Filed: Nov. 6, 2012

(86) PCT No.: PCT/US2012/063708
§ 371 (c)(1),
(2) Date: May 6, 2015

(87) PCT Pub. No.: WO2014/074089
PCT Pub. Date: May 15, 2014

(65) Prior Publication Data
US 2015/0286360 A1 Oct. 8, 2015

(51) Int. Cl.
| | |
|---|---|
| *G06F 3/0488* | (2013.01) |
| *G06F 3/14* | (2006.01) |
| *H04B 1/20* | (2006.01) |
| *G05B 15/02* | (2006.01) |
| *G06F 3/041* | (2006.01) |
| *G06F 3/0482* | (2013.01) |
| *G06F 3/0484* | (2013.01) |
| *G06F 3/0485* | (2013.01) |

(Continued)

(52) U.S. Cl.
CPC .......... *G06F 3/0488* (2013.01); *G05B 15/02* (2013.01); *G06F 3/0412* (2013.01); *G06F 3/0482* (2013.01); *G06F 3/0485* (2013.01); *G06F 3/04842* (2013.01); *G06F 3/04845* (2013.01); *G06F 3/14* (2013.01); *G06F 3/165* (2013.01); *H04B 1/202* (2013.01); *G06F 2203/04104* (2013.01); *G06F 2203/04808* (2013.01); *H04M 1/72533* (2013.01)

(58) Field of Classification Search
CPC .......... G06F 3/0486; H04R 27/00; H04S 7/00
See application file for complete search history.

(56) References Cited

U.S. PATENT DOCUMENTS 8,290,603 B1 * 10/2012 Lambourne ............ G11B 27/00
381/104
2008/0177822 A1  7/2008 Yoneda
2009/0179867 A1  7/2009 Shim
(Continued)

FOREIGN PATENT DOCUMENTS

WO   WO2012/145321 A1   10/2012
WO   WO2013/049346 A1   4/2013

*Primary Examiner* — Kevin M Nguyen
(74) *Attorney, Agent, or Firm* — Peter A. Nieves; Sheehan Phinney Bass & Green PA

(57) ABSTRACT

A selectively coordinated audio playback system is disclosed. The audio playback system includes multiple audio players serving, receiving and rendering audio content audio content. A controller is in communication with the audio players and controls the audio content provided on each audio player. The controller includes a touchscreen user interface to receive user inputs and is configured to selectively coordinate the audio content from the multiple audio players according to gestures detected via the touchscreen interface.

15 Claims, 14 Drawing Sheets

(51) Int. Cl.
   *G06F 3/16*   (2006.01)
   *H04M 1/725*   (2006.01)

(56) References Cited

U.S. PATENT DOCUMENTS

| | | |
|---|---|---|
| 2011/0273380 A1 | 11/2011 | Martin |
| 2012/0121105 A1 | 5/2012 | Holladay et al. |
| 2012/0184335 A1* | 7/2012 | Kim .................... G06F 3/04883 |
| | | 455/566 |
| 2012/0274664 A1 | 11/2012 | Fagnou |
| 2013/0019193 A1* | 1/2013 | Rhee .................... G06F 3/0486 |
| | | 715/769 |
| 2013/0080955 A1* | 3/2013 | Reimann ............... G06F 3/0486 |
| | | 715/769 |

* cited by examiner

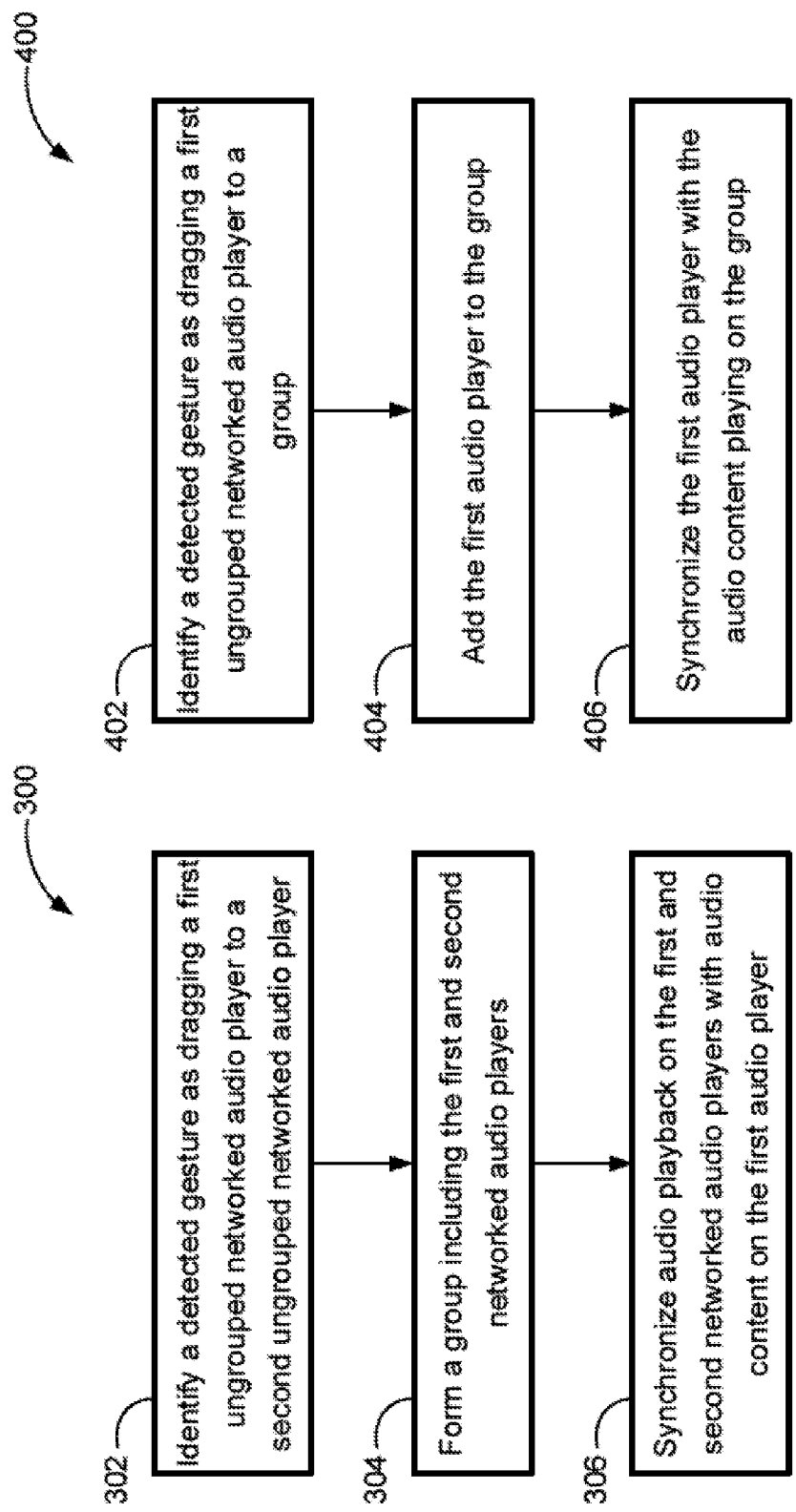

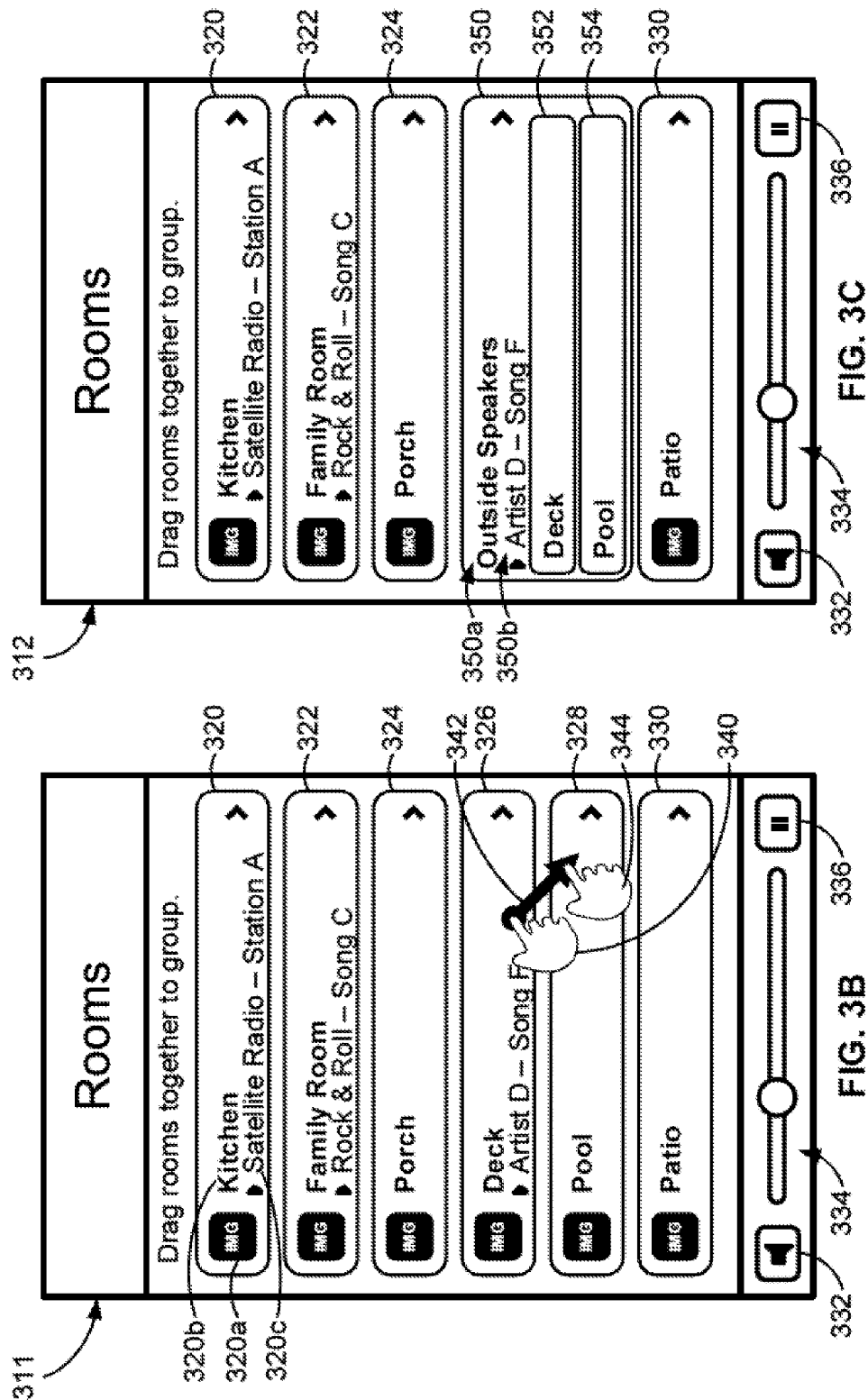

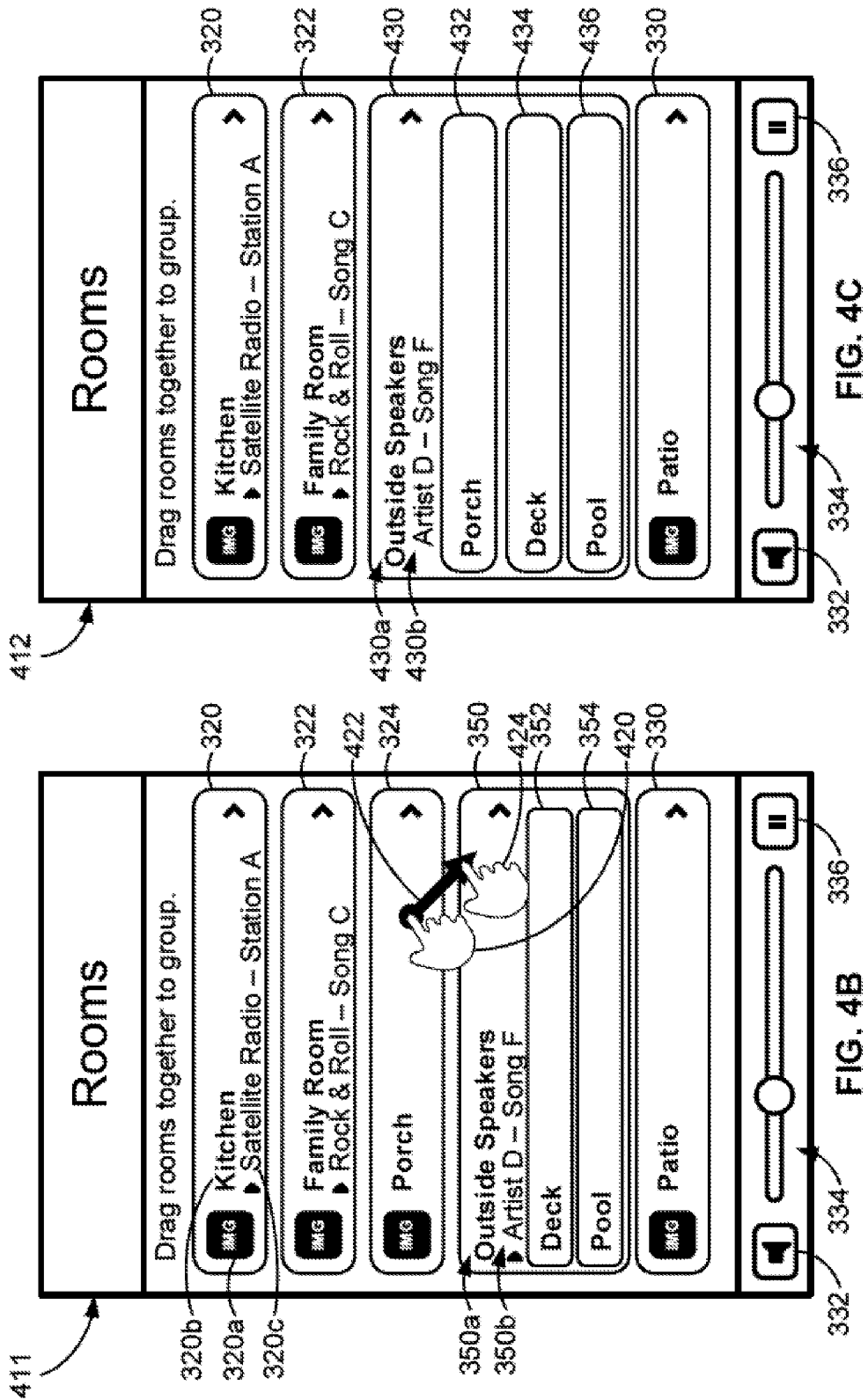

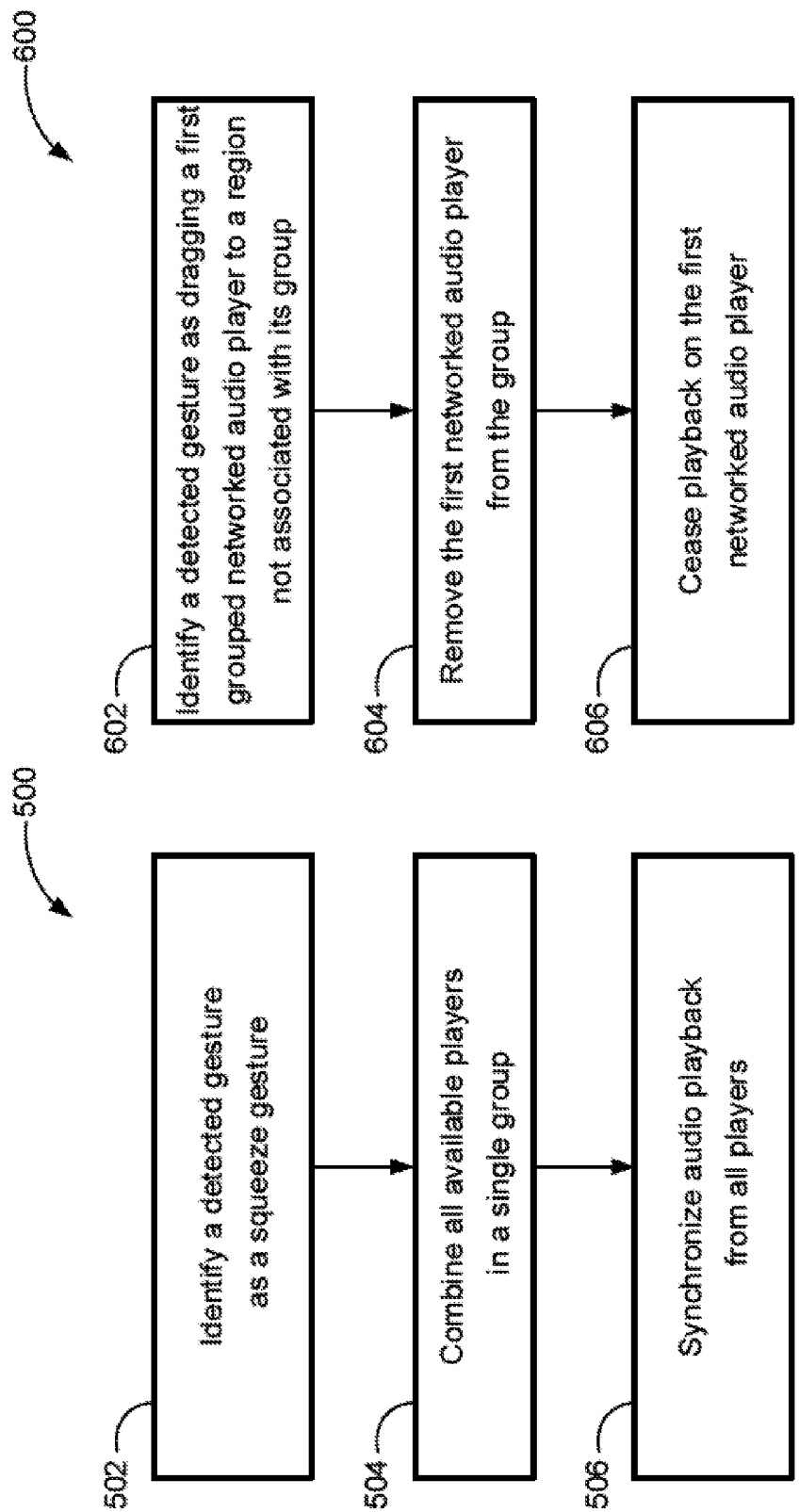

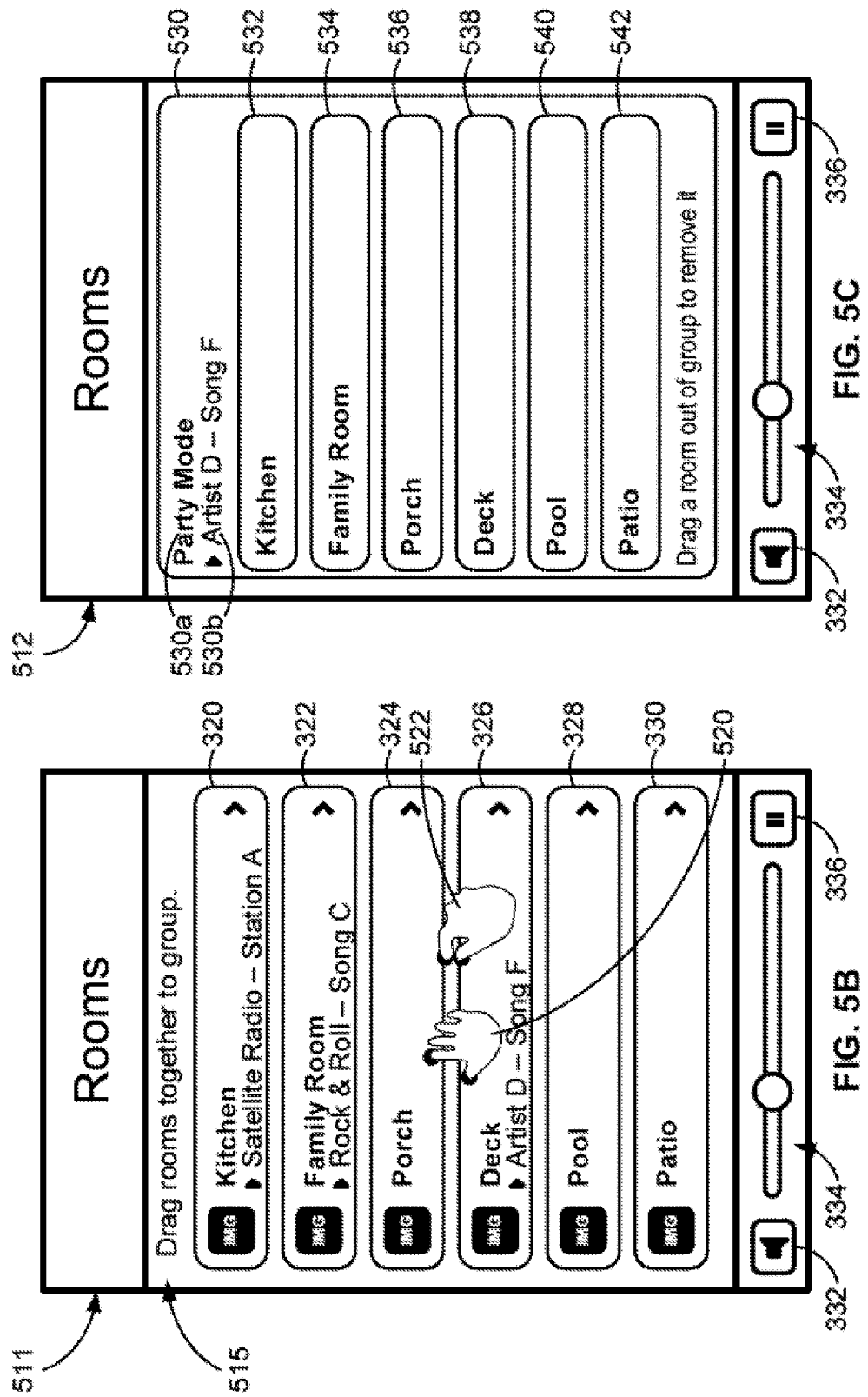

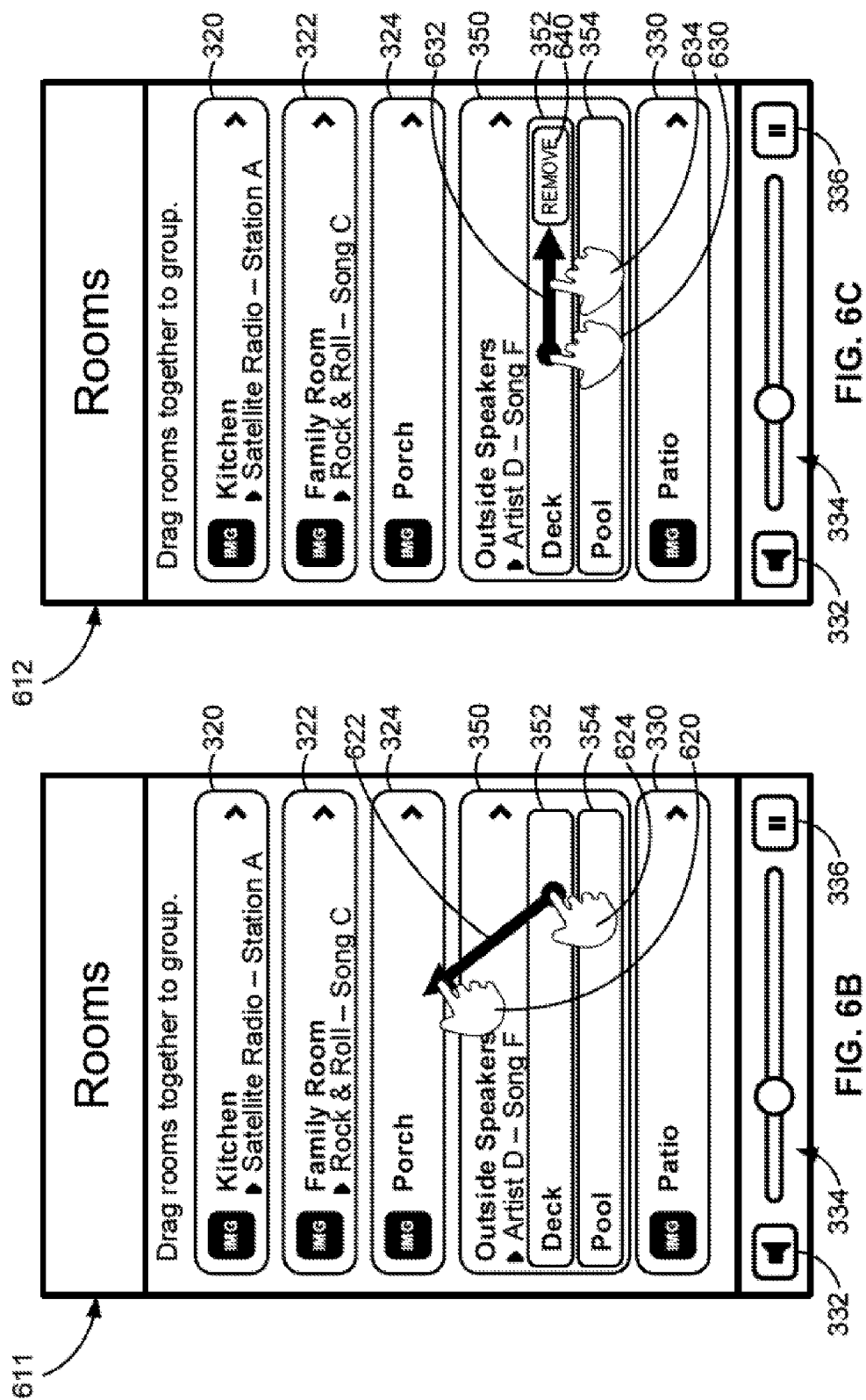

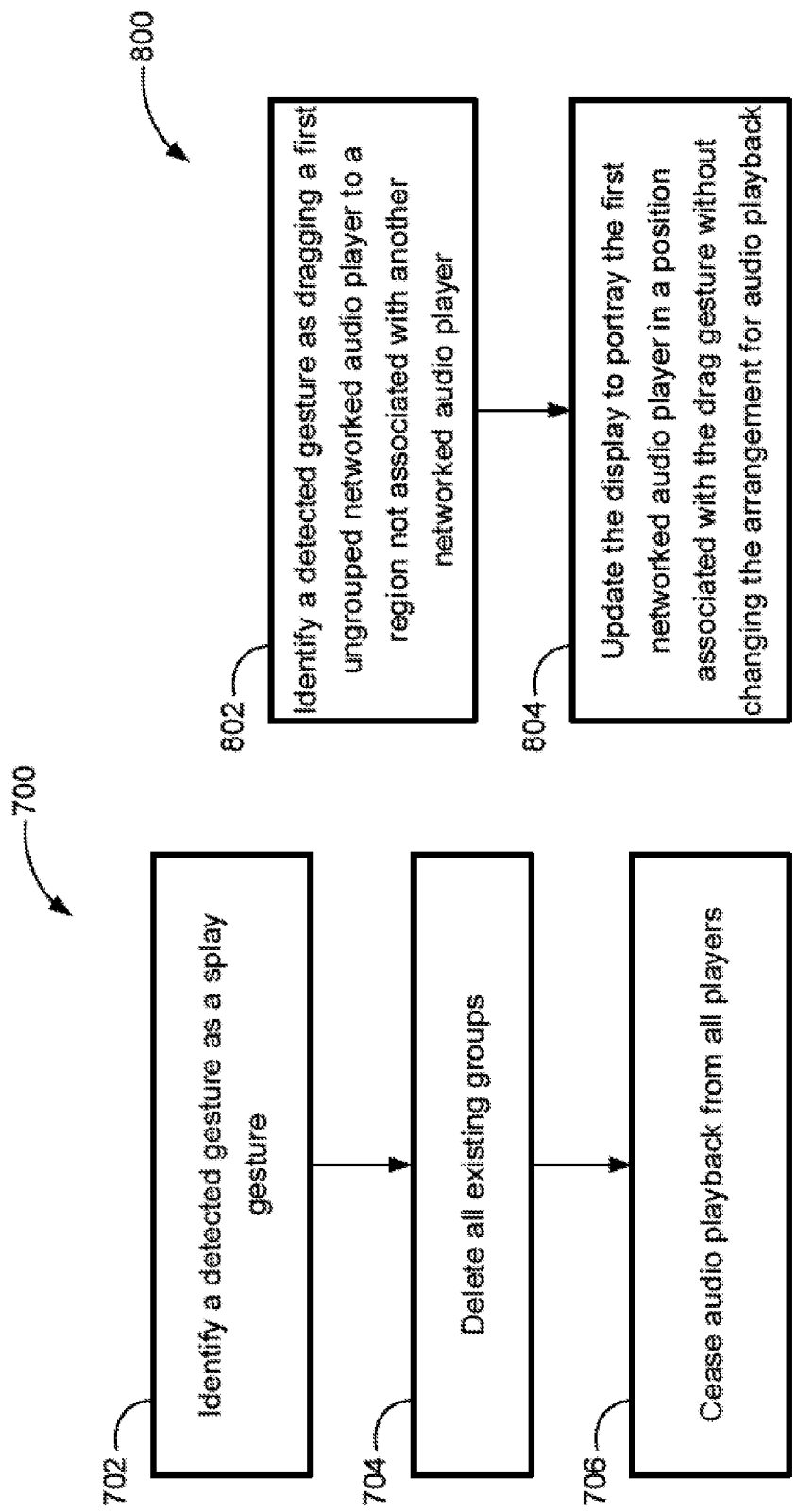

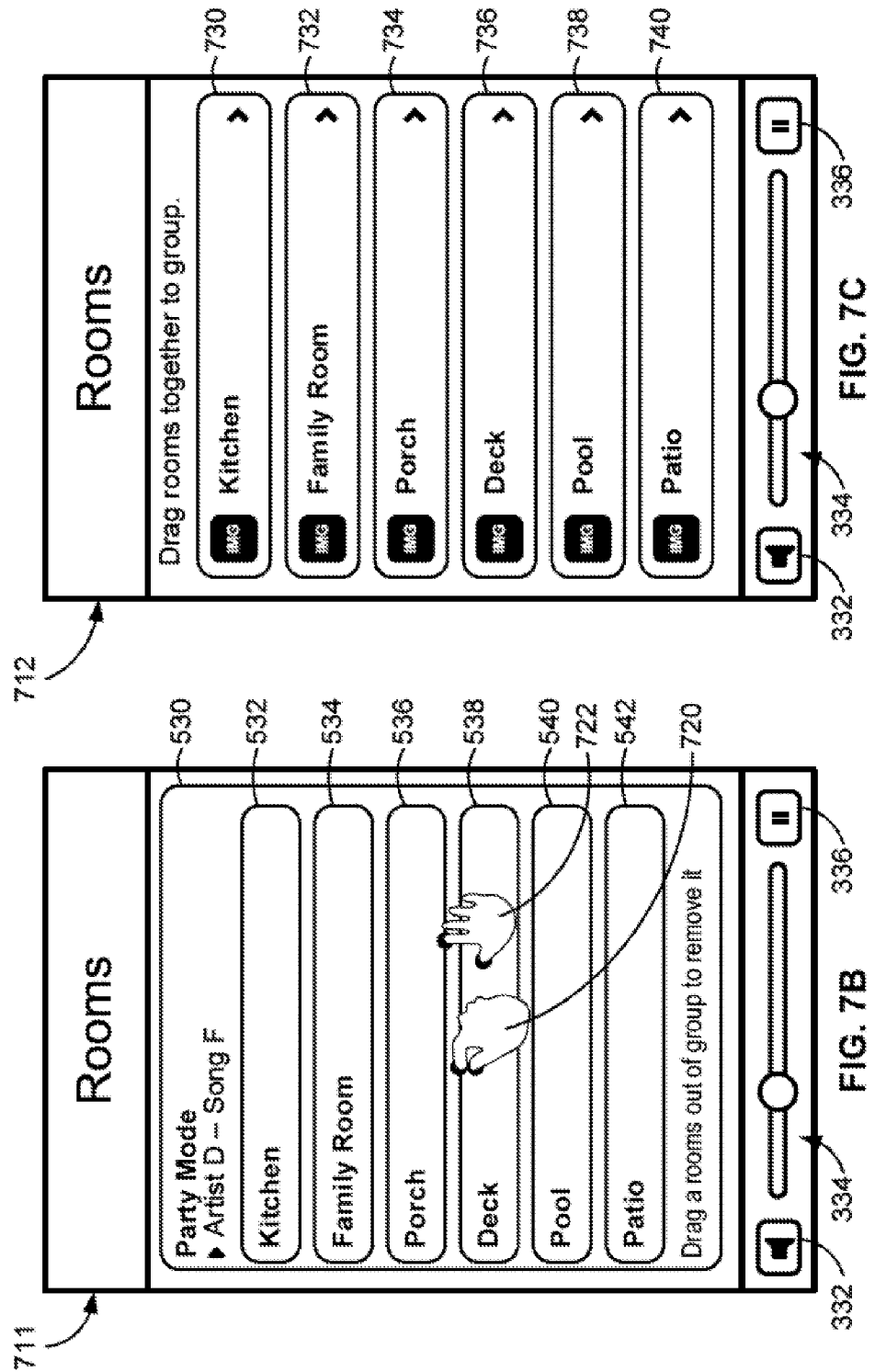

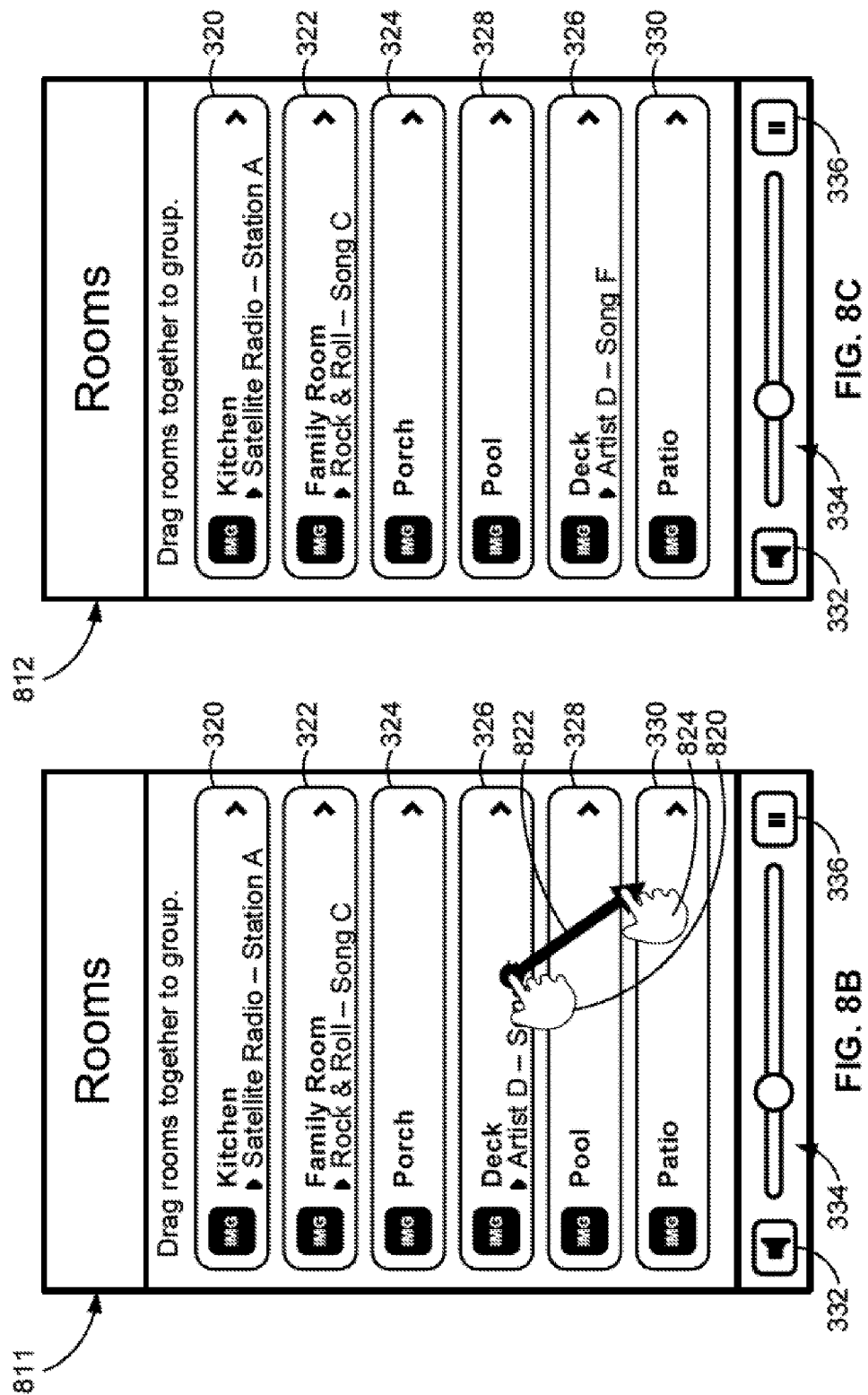

SELECTIVELY COORDINATED AUDIO PLAYER SYSTEM

BACKGROUND

Unless otherwise indicated herein, the materials described in this section are not prior art to the claims in this application and are not admitted to be prior art by inclusion in this section.

Audio players can be situated in distinct regions of a home or other structure to provide playback in such distinct regions. Each of the audio players can have its own amplifier(s) and one or more speakers and typically installed in one place. For instance, one audio player system can be situated in a living room, while another is in a bedroom. Thus, separate regions/zones of the home can have separate audio players to playback from the same or different audio sources. To playback an audio source, the audio source is provided locally at each audio player, such as via the Internet, local network server, attached storage, external analog audio input, a compact disc or a radio broadcast, etc. Thus, each room can provide the same or different audio content by separately controlling the separate audio player systems. In some examples, a single audio player system can include hardwired speakers in multiple rooms so as to create a unified audio environment in otherwise acoustically separated rooms. For example, ceiling mounted speakers may be provided throughout a home to play audio content from a single source of audio content.

Digital audio players can be configured to playback audio content from a digital source of audio content, such as a digital media file. Digital audio players can be a portable digital music player, a stationary audio-video receiver, a television, or a computer, and digital media files can be stored locally on such devices or can be stored on a remote server that streams digital media files via the Internet.

SUMMARY

A user interface for dynamically managing audio playback from a system of networked audio players includes a touch-sensitive display. The touch-sensitive display is used to detect gesture inputs and associate the gesture inputs with arrangements for audio playback from the audio players. The system can be arranged to synchronously playback common audio content on a group of audio players or playback separate audio content on each audio player, or some combination. In some embodiments of the present disclosure, a single gesture input, such as a drag gesture, a splay gesture, a squeeze gesture, etc., can cause the system to form a group of audio players for synchronous playback or edit membership of an existing group of audio players for synchronous playback. For example, a single drag gesture input to the user interface can cause the system to form a group for synchronous playback with selectable members, add selectable players to an existing group, remove selectable players from an existing group, etc. Additionally or alternatively, a single squeeze or splay gesture input to the user interface can cause the system to join all players in a single group and/or remove all players from existing groups.

Some embodiments of the present disclosure provide a method for arranging a plurality of networked audio players according to input from a touch-sensitive display. The method can include instructing the touch-sensitive display to portray a representation of at least a portion of the plurality of networked audio players. The method can include receiving data indicative of a gesture input via the touch-sensitive display. The method can include associating the received data with a gesture-indicated arrangement for audio playback from the plurality of networked audio players. The method can include instructing the plurality of networked audio players to provide audio playback according to the gesture-indicated arrangement. The method can include instructing the touch-sensitive display to portray a representation of at least some of the plurality of networked audio players including an indication of the gesture-indicated arrangement.

Some embodiments of the present disclosure provide a method. The method can include detecting a gesture via a touch-sensitive display while the touch-sensitive display displays a representation of at least some of a plurality of networked audio players. The method can include associating the detected gesture with a gesture-indicated arrangement for audio playback from the plurality of networked audio players. The method can include instructing the plurality of networked audio players to provide audio playback according to the gesture-indicated arrangement. The method can include displaying, via the touch-sensitive display, a representation of at least some of the plurality of networked audio players including an indication of the gesture-indicated arrangement.

Some embodiments of the present disclosure provide a system including a plurality of networked audio players and a controller. The plurality of networked audio players can each be configured to playback audio content according to network-delivered instructions. The controller can include a user interface having a touch-sensitive display. The controller can be configured to detect a gesture via the touch-sensitive display while the touch-sensitive display portrays a representation of at least some of the plurality of networked audio players. The controller can be configured to associate the detected gesture with a gesture-indicated arrangement for audio playback from the plurality of networked audio players. The controller can be configured to instruct the plurality of networked audio players to provide audio playback according to the gesture-indicated arrangement. The controller can be configured to display a representation of at least some of the plurality of networked audio players including an indication of the gesture-indicated arrangement for coordinated audio playback.

Some embodiments of the present disclosure provide a computer readable medium storing instructions that, when executed by one or more processors in a computing device, cause the computing device to perform operations. The operations can include instructing a touch-sensitive display to portray a representation of at least a portion of a plurality of networked audio players. The operations can include receiving input data indicative of a gesture input via the touch-sensitive display. The operations can include associating the received data with a gesture-indicated arrangement for audio playback from the plurality of networked audio players. The operations can include instructing the plurality of networked audio players to provide audio playback according to the gesture-indicated arrangement. The operations can include instructing the touch-sensitive display to portray a representation of at least some of the plurality of networked audio players including an indication of the gesture-indicated arrangement.

These as well as other aspects, advantages, and alternatives, will become apparent to those of ordinary skill in the art by reading the following detailed description, with reference where appropriate to the accompanying drawings.

BRIEF DESCRIPTION OF THE FIGURES

FIG. 3A is a flowchart of a process for creating a group via the touch-sensitive display user interface.

FIG. 3B is an example embodiment of the touch-sensitive display with overlaid gesture indicators illustrating an example of the process for creating a group.

FIG. 3C is an example embodiment of the touch-sensitive display following creation of the group as indicated in FIG. 3B.

FIG. 4A is a flowchart of a process for adding players to a group via the touch-sensitive display user interface.

FIG. 4B is an example embodiment of the touch-sensitive display user interface with overlaid gesture indicators illustrating an example of the process for adding players to a group.

FIG. 4C is an example embodiment of the touch-sensitive display following adding players to the group as indicated in FIG. 4B.

FIG. 5A is a flowchart of a process for joining all available players to a single group via the touch-sensitive display user interface.

FIG. 5B is an example embodiment of the touch-sensitive display user interface with overlaid squeeze gesture indicators illustrating an example of the process for joining all available players to a single group.

FIG. 5C is an example embodiment of the touch-sensitive display following grouping all available players as indicated in FIG. 5B.

FIG. 6A is a flowchart of a process for individually removing players from a group via the touch-sensitive display user interface.

FIG. 6B is an example embodiment of the touch-sensitive display user interface with overlaid gesture indicators illustrating an example of the process for individually removing a player from a group.

FIG. 6C is an example embodiment of the touch-sensitive display user interface with overlaid gesture indicators illustrating another example of the process for individually removing a player from a group.

FIG. 7A is a flowchart of a process for breaking all existing groups via the touch-sensitive display user interface.

FIG. 7B is an example embodiment of the touch-sensitive display user interface with overlaid splay gesture indicators illustrating an example of the process for breaking all existing groups.

FIG. 7C is an example embodiment of the touch-sensitive display following breaking all existing groups as indicated in FIG. 7B.

FIG. 8A is a flowchart of a process for ordering players on the touch-sensitive display user interface.

FIG. 8B is an example embodiment of the touch-sensitive display user interface with overlaid gesture indicators illustrating an example of the process for ordering players.

FIG. 8C is an example embodiment touch-sensitive display following the ordering players as indicated in FIG. 8B.

DETAILED DESCRIPTION

Figure 1A:
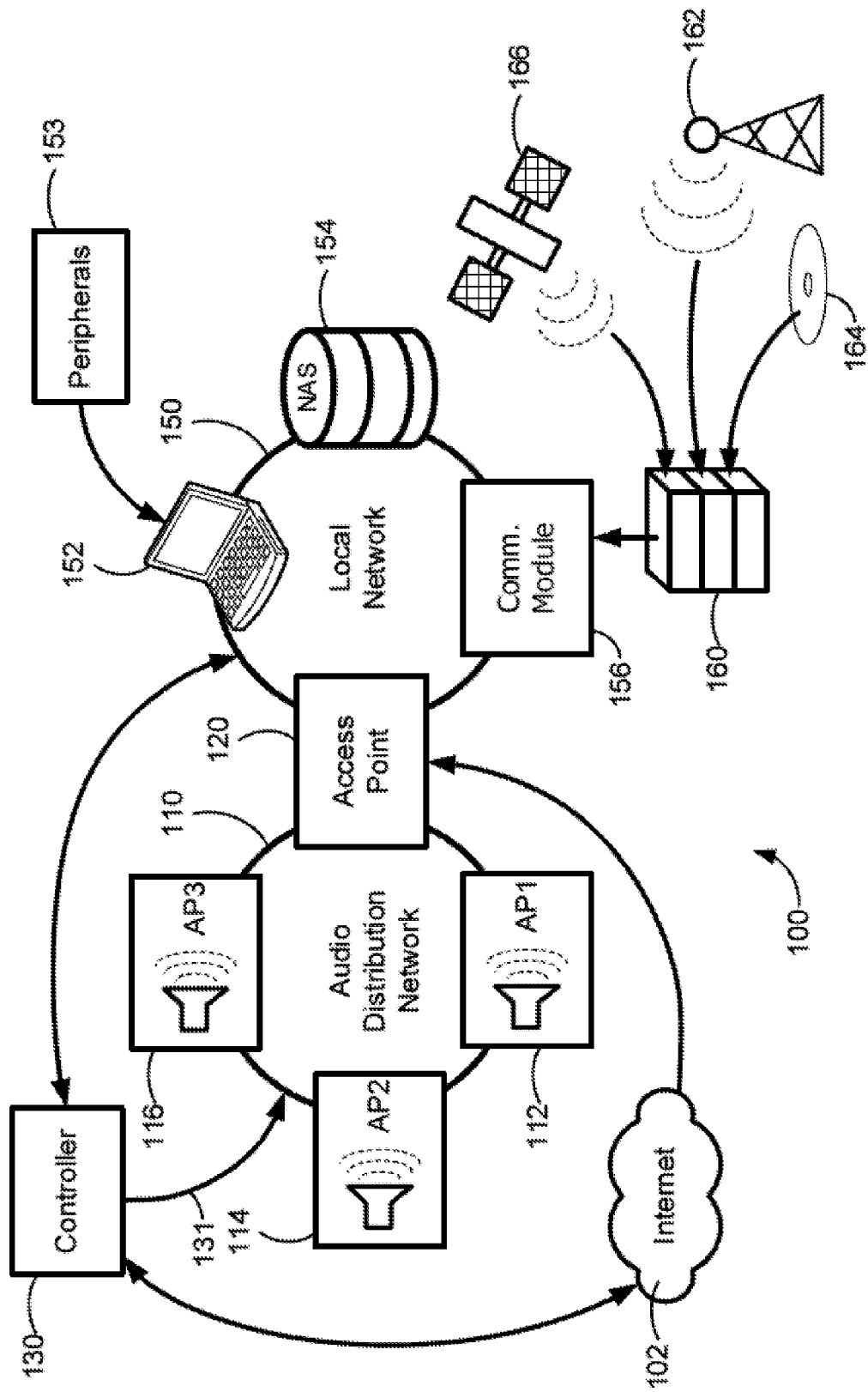
FIG. 1A is a functional block diagram of an audio content distribution system with multiple audio players providing audio content in accordance with instructions from a controller.

Example embodiments disclosed herein relate to a system for coordinated distribution of audio content to a group of networked audio players. The networked audio players are each configured to playback audio content according to instructions from a controller. Additionally, the audio players can optionally include a user interface to enable local control of the players and/or selection of audio content to be played on one or more of the networked audio players. The audio content can be streamed via the Internet, from a local server, hard drive, or flash memory device on the controller or another network-accessible location, or from an analog or digital audio source that is made network accessible locally. For example, a receiver can be arranged with audio outputs connected to a network enabled device configured to convert and stream an audio stream to the networked audio players (e.g., AM or FM encoded radio audio content, satellite radio audio content, compact disc encoded audio content, vinyl record audio content, etc.).

The controller includes a user interface suitable for browsing and selecting audio content for playback on the networked audio players from a variety of sources. The user interface also allows for selecting an arrangement for coordinated audio playback from the networked audio players. In some arrangements for audio playback, multiple audio players can play synchronized audio content. In some arrangements for audio playback, multiple audio players can play different audio content. In examples where the networked audio players are located in distinct zones of an audio environment (e.g., separate rooms of a building), separate control over the audio players allows for selectable audio content throughout the audio environment. For example, all rooms on one level of a home can be grouped for synchronous playback to create a unified audio environment, while rooms on another level can each playback different audio content, or none at all, while all are controlled from a single user interface.

In some embodiments, the controller and/or controller user interface can be integrated with one or more of the networked audio players (e.g., integrated within a cabinet of an audio players). Moreover, in some examples, multiple controllers integrated with the one or more of the networked audio players and/or remotely located controllers can operate together to browse and select audio content for playback and to select an arrangement for audio playback.

In some embodiments of the present disclosure, the controller includes a touch-sensitive display and is configured to detect gesture inputs. Gesture inputs may involve one or more fingers moving across the surface of the display (e.g., dragging a finger across the touch-sensitive display). Gesture inputs may also involve one or more fingers contacting the display (e.g., tapping the touch-sensitive display). Gesture inputs can be detected by sensing, for example, one or more fingers in motion with respect to the touch-sensitive display. The controller can associate the detected gesture inputs with arrangements for audio playback and instruct the networked audio players to provide audio content according to the arrangement associated with the gesture. For example, a drag and drop gesture that drags a representation of one audio player to another can be associated with forming a group for synchronized playback from the two players. In another example, a drag and drop gesture that drags a representation of an audio player in a pre-existing group to a region not part of the pre-existing group can be associated with removing the player from the pre-existing group and ceasing playback on the player. In another example, a squeeze or pinch inward gesture can be associated with grouping all available players together to provide synchronized playback across the entire audio environment. In another example, a splay or pinch outward gesture can be associated with removing all available players from any pre-existing groups and ceasing playback from all players.

FIG. 1A is a functional block diagram of an audio content distribution system 100 with multiple audio players playing audio content in accordance with instructions from a controller 130. The audio players are linked in an audio distribution network 110 and can receive audio content for playback from the Internet 102 and/or from a local network 150. The controller 130 includes an interface to allow a user to select audio content to playback from each networked audio player and optionally coordinate playback from a group of the networked audio players.

A first networked audio player 112 ("AP1"), a second networked audio player 114 ("AP2"), and a third networked audio player 116 ("AP3") are network connected in the audio distribution network 110. Each of the audio players 112-116 is configured to output audio content (e.g., emit sound waves) according to instructions 131 from the controller 130. The audio players 112-116 can therefore include communication interfaces for interacting with the audio distribution network 110, amplifiers for generating electrical driver signals based on the audio content (as indicated by the instructions 131), and speakers for creating sound waves emitted from the player. The instructions 131 can be transmitted wirelessly to the audio distribution network 110 (e.g., via wireless or wired networks) and/or communicated through wires (e.g., via a cable connected to the controller 130).

In some examples, the networked audio players 112-116 receive data streams of audio content (e.g., web-streamed audio), and generate electrical signals associated with the audio content. The electrical signals can be used to drive an integrated speaker so as to generate sound waves based on the received data stream. In some examples, the networked audio players 112-116 can output electrical signals through audio cables to an external amplifier and/or external speaker, which can then generate sound waves according to the electrical signals. In some examples, the networked audio players generate sound waves based on audio content that is locally stored or delivered (e.g., locally stored digital audio or audio content received via an audio input jack on one of the networked audio players 112-116).

The instructions 131 from the controller 130 can specify a source of audio content to be played on each of the audio players 112-116, and the audio players 112-116 and/or specified sources of audio content can then query and deliver a stream of the specified audio content to the respective audio players 112-116 via the audio distribution network 110, Internet 102, and/or local network 150, etc. The instructions 131 can additionally or alternatively include a stream of audio content to be played on one or more of the audio players 112-116, such as a stream of audio content stored locally on the controller 130 or streamed from the Internet 102, for example. In some instances, the instructions 131 can also specify that some or all of the audio players 112-116 are grouped together for synchronized playback. In synchronized playback scenarios a synchronization signal can be provided from the controller 130 or from one of the audio players 112-116, or a combination of these, etc. to initiate playback of a specified portion of a buffered stream of audio content. Other techniques for synchronizing audio playback from multiple players can also be employed. While the audio distribution network 110 is illustrated with three audio players 112-116, this is for purposes of explanation only; implementations of the system 100 can include an audio distribution system with more than, or less than, three audio players, such as two, four, five, six, etc.

The audio distribution network 110 can include both wired and wireless communication interfaces. The access point 120 can be a router and/or bridge for allowing the audio distribution network 110 to access the Internet 102, the controller 130, and/or a local network 150. The audio distribution network 110 can be arranged by any network topology sufficient to allow communication of the instructions 131, and delivery of audio data streams, to the audio players 112-116. For example, the audio distribution network 110 can be arranged with peer-to-peer mesh communications among the audio players 112-116, with a hub-and-spoke configuration centered at the access point 120, etc. In some examples, the audio players 112-116 can also serve as wireless signal repeaters to extend the effective range of the audio distribution network 110 and/or the local network 150.

The local network 150 includes a personal computer 152, a networked attached storage device 154 ("NAS") and a communication module 156 for digitizing and streaming audio content from a receiver 160. The communication module 156 can receive output audio content from the receiver 160 and dynamically generate a digital representation of the audio content. The communication module 156 can also include a network interface and a memory for buffering digital audio content to be communicated to the local network 150. In some embodiments, the communication module 156 and receiver 160 are implemented in a single audio player hardware module configured to stream audio content to the local network 150 and/or audio distribution network 110. The personal computer 152 can also provide digitized audio content to the local network 150, either from an internal flash memory and/or hard drive, or from media, such as a compact disc, in the personal computer 152. Moreover, peripherals 153, such as USB-connected flash memory devices, external hard drives, etc., can be connected to the personal computer 152 to provide digital audio content from the peripherals 153 to the local network 150. Moreover, similar peripherals storing digital audio content can be connected to one or more of the audio players 112-116 (e.g., via a connection port included on the audio players 112-116). The network attached storage 154 can be a local server or network-connected hard drive storing digital audio content that is made available to the local network 150.

The receiver 160 can output audio content from a variety of sources. For example, the receiver 160 can include a satellite radio antenna for receiving streaming satellite radio content from a satellite source 166. The receiver 156 can receive audio content from physical media 164, such as a compact disc, digital versatile disc, cassette tape, vinyl record, etc. The receiver 160 can also receive audio content from an amplitude-modulated and/or frequency-modulated radio broadcast 162. Other sources of audio content including non-digital sources (e.g., analog sources) can be received via the receiver 160 and made available to the local network 150 via the communication module 156.

While the local network 150 is illustrated and described in connection with a single personal computer 152, network attached storage 154, and communication module 156 with receiver 160, this configuration is provided for purposes of explanation only; the present disclosure is not so limited. For example, multiple personal computers, network attached storages and/or communication modules with receivers can be included in the local network 150. Furthermore, none of these items are required to be present in the local network 150. For example, the local network 150 need not include even a single personal computer 152, or even a single network attached storage device 154, etc.

The controller 130 is in communication with the local network 150 and the audio distribution network 110. The controller 130 can be included in the local network 150 and/or the audio distribution network 110. That is, the controller 130 can be a member of either the local network 150, the audio distribution network 110, or both. The controller 130 can also be in communication with the internet 102 either directly or via the access point 120. The controller 130 includes a user interface to allow for browsing and/or searching available sources of audio content and selecting players in the audio distribution network 110 to playback selected audio content. For example, a browsing and/or searching menu can allow for selecting among audio content available on the local network 150 (e.g., from the personal computer 152, the network attached storage 154, the receiver 160). The controller 130 can be further configured to allow selection of one or more audio sources for playback via one or more of the audio players 112-116 in the audio distribution network 110. For example, the controller 130 can provide instructions to the audio distribution network 110 to a music file stored on the network attached storage 154 to be played back via the first audio player 112 while web-streamed audio content is played back via both the second and third audio players 114, 116. In some embodiments, the controller 130 can also provide instructions to synchronize playback among audio players providing the same audio content. Such synchronization instructions can include, for example, sending a timing signal that indicates timing to initiate playback of a pre-determined buffered portion of the audio content from all players. It is noted that communication signals between the controller 130 and the networked audio players 112-116 (e.g., via the audio distribution network 110) can include multiple standardized communications useful to tracking the status of the players in the audio distribution network 110, such as intermittent status updates, queries for current status, requests for information, acknowledgement receipts, etc.

The local network 150 thus provides a source of audio content to be played via one or more of the audio players 112-116 in the audio distribution network 110. However, other sources of audio content are available in addition to, or in lieu of, the local network 150. For example, web-streamed audio content can be delivered from the internet 102 through the access point 120, directly to the audio distribution network 110, without including any of the audio content sources present in the local network 150. Web-streamed audio content can include, for example, subscription-based services providing access to a music catalog, a privately held collection of cloud-hosted digital audio content, etc. In another example, audio content can be delivered to the audio distribution network 110 from audio content locally stored and/or dynamically rendered by the controller 130. In another example, audio content can be delivered to the audio distribution network 110 from audio content locally stored on one of the audio players 112-116 or from an analog or digital source of audio content connected to one of the audio players 112-116. Thus, some embodiments of the present disclosure may be implemented without the local network 150, such as when audio content is delivered to the audio distribution network 110 from a source other than the local network 150.

A variety of network topologies may be employed to connect the networked components in the system 100. In some examples, the system 100 may include both the audio distribution network 110 and the local network 150 as illustrated in FIG. 1A. In other examples, the system 100 may be implemented with a single network. For example, networked audio players can be joined to the local network 150. Additionally or alternatively, networked audio content sources (e.g., the personal computer 152) can be joined to the audio distribution network 110.

Figure 1B:
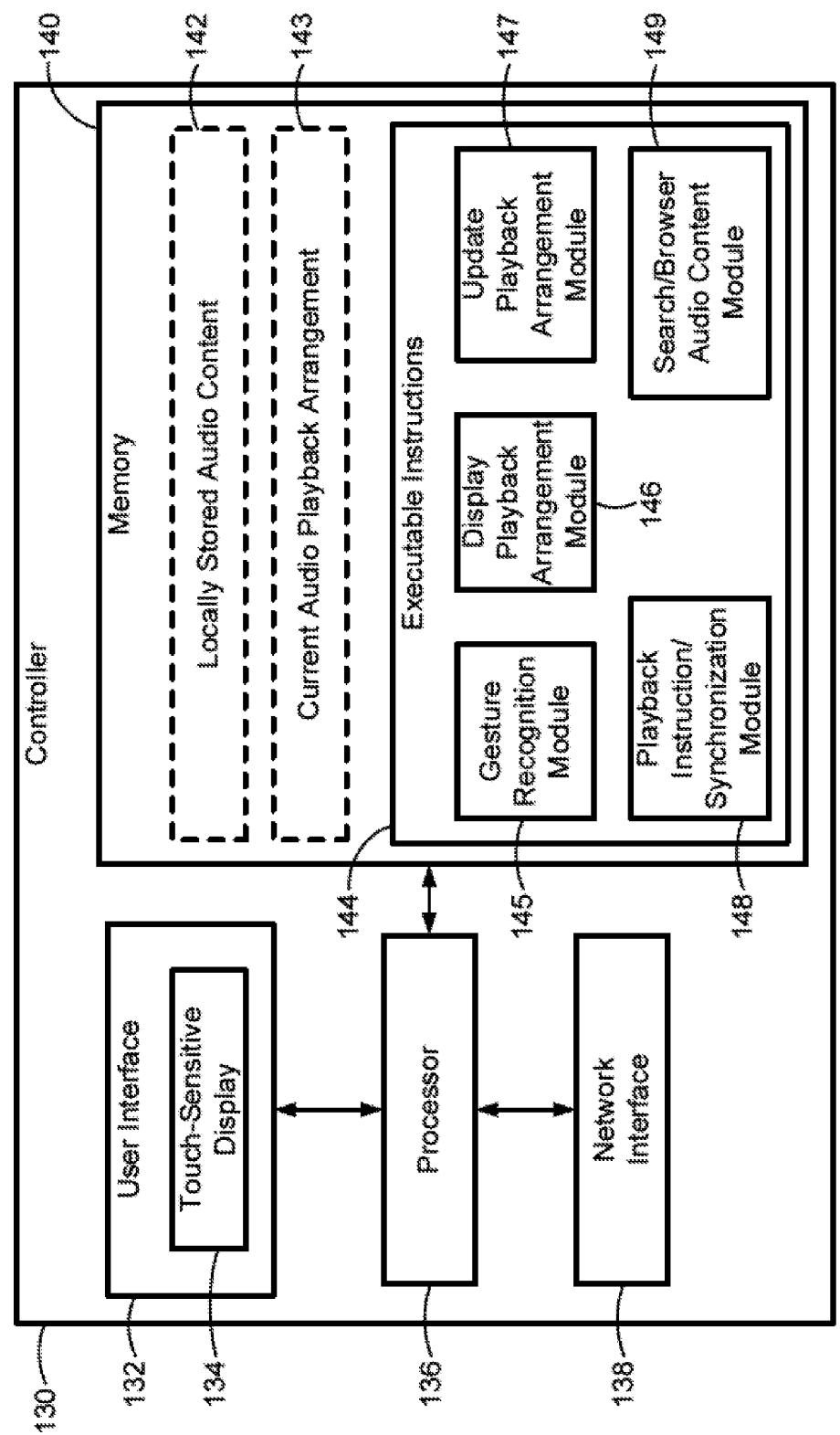
FIG. 1B is a functional block diagram of the controller including a touch-sensitive display user interface.

FIG. 1B is a functional block diagram of the controller 130 including a touch-sensitive display user interface 132. The controller 130 includes a user interface 132 for receiving user inputs. A processor 136 instructs the user interface 132 to provide information to a user and receives indications of user inputs. A network interface 138 allows the controller 130 to send and receive information to and from external sources, such as the Internet 102, the audio distribution network 110, and/or the local network 150, etc. The network interface 138 can employ wireless (e.g., networks configured according to the IEEE 802.11, 802.15, 802.16, and 802.20 standard networks, including sub-groups and/or updates to such standards; 3G and/or 4G cellular networks, etc.) and/or wired communication to allow communication of the instructions 131 to the audio distribution network 110.

The processor 136 also communicates with a memory 140 that stores executable instructions 144. The memory 140 is a non-transitory computer-readable medium that can include, without limitation, magnetic disks, optical disks, organic memory, and any other volatile (e.g. RAM) or non-volatile (e.g. ROM) storage system readable by the processor 136. The memory 140 can also optionally store local audio content 142 and/or an indication of the current arrangement for audio playback 143 via the audio distribution network 110. The local audio content 142 can provide an additional source of audio content for playback on the audio distribution network 110. The current arrangement for audio playback 143 can indicate audio content being played back from each of the audio players 112-116 in the audio distribution network 110. Additionally or alternatively, the current arrangement for audio playback 143 can indicate groups among the audio players 112-116 for coordinated playback of common audio content, such as synchronized playback from more than one of the audio players 112-116. In some examples, data indicating the current audio playback arrangement can be additionally or alternatively stored externally (e.g., on the local network 150 and/or audio distribution network 110) so as to be accessible to the controller 130 via the network interface 138.

The user interface 132 includes a touch-sensitive display 134 for displaying information to a user and receiving touch and/or gesture inputs. The touch-sensitive display 134 can include a display panel with an array of pixels configured to emit, transmit, and/or reflect light according to display information (e.g., display driver signals). Such a display panel is not limited to particular display technology and can include, for example, liquid crystal elements, organic light emitting diode elements, etc. The display panel can also include a detection system sensitive to contact with the panel to detect touch inputs, which can optionally be integrated with the display panel. Such a detection system is not limited to a particular technology and can include, for example, a capacitive detection array sensitive to local changes in capacitance resulting from contact with and/or proximity to the display, a resistance detection array sensitive to local changes in resistance resulting from contact with and/or proximity to the display, an optical detection system sensitive to light leakage from a layer of the display panel due to deflection resulting from contact with the display, etc. The touch-sensitive display 134 is not required to take any particular form factor or include any particular display and/or touch-detection technology so long as the display and associated and/or integrated touch-sensitive system function to detect touch inputs to the display. The user interface 132 can also optionally include additional user input and/or interface components such as buttons, dials, indicator lights, voice prompts, voice commands, infrared receiving ports, etc.

Executable instructions 144 are stored in the memory 140 to be executed by the processor 136. The executable instructions 144 can include one or more software-implemented modules for operating the controller 130 to function as described above: to allow searching/browsing of available audio content and selection of audio content to playback via the audio distribution network 110 according to a user-configured arrangement. The controller 130 can also be configured to control audio playback via the one or more networked audio players by providing audio playback controls (e.g., a play command to initiate playback, a pause or stop command to interrupt playback, forward and reverse commands to skip songs, or jump to different portions of a track, etc.).

A search/browse audio content module 149 is provided to allow for searching and selecting available audio content on the local network 150, the Internet 102, locally stored audio content 142, etc. Audio content from the Internet 102 can be associated with subscription audio streaming services and the search/browse audio content module can optionally allow for storing user passwords for such services to allow for an integrated user interface to content from such providers. Audio content from the Internet 102 can also include Internet-delivered radio streams, audio files resident on a server not connected to the local network 150, etc. A gesture recognition module 145 detects and identifies gesture inputs received via the touch-sensitive display 134. For example, the gesture recognition module 145 can detect a drag or swipe gesture and output indications of start and stop points of the drag gesture, with respect to the touch-sensitive display 134. The gesture recognition module 145 can optionally detect multi-touch gestures such as a "squeeze" gesture where two or more touch points (e.g., fingers) simultaneously contact the touch-sensitive display 134 and move closer together and/or a "splay" gesture where two or more touch points (e.g., fingers) simultaneously contact the touch-sensitive display 134 and move apart.

A display playback arrangement module 146 provides display instructions to the touch-sensitive display 134 (e.g., display driver signals). The display can be driven to portray a representation of the available audio players (e.g., the audio players 112-116) in a manner that indicates the current arrangement for audio playback. For example, each audio player can be represented as an icon with a visually distinctive border encompassing text labels and/or images identifying the audio player and audio content currently playing on the audio player. For audio players grouped together for synchronized playback, the display playback arrangement module 146 can provide display instructions that cause the display panel to portray a visually distinctive border surrounding the representations of all audio players in the group. Text labels and/or images can be included within the border indicating the group to label the group and identify any audio content currently playing on the audio players in the group. Additionally or alternatively, representations of grouped audio players can be color coordinated according to their group membership, or otherwise visually indicated to allow a user to interpret group membership of the players 112-116.

A playback instruction/synchronization module 147 generates the instructions 131 to one or more of the audio players 112-116 in the audio distribution network 110 to cause the audio players to playback audio content according to the current audio playback arrangement 143. The instructions 131 can be communicated to the audio distribution network 110 and/or the local network 150 via the network interface 138. The instructions 131 from the playback instruction/synchronization module 147 can include indications of audio content to be played by each audio player in the audio distribution network 110. For example, the instructions 131 can indicate an audio file (or series of audio files) to play and location(s) of the file on the local network 150 and/or Internet 102, etc. The instructions 131 can also synchronize playback among audio players in a group. For example, the instructions 131 can include a timing signal for each player in a group to initiate playback of an audio file or to play an identified buffered portion of a streaming audio file. However, other approaches for instructing synchronized playback can also be employed.

An update playback arrangement module 148 receives an indication of a gesture detected/identified via the gesture recognition module 145 and associates the gesture with a modified arrangement for audio playback. Modified arrangements for audio playback can include forming a new group, deleting a pre-existing group, and/or revising membership in a pre-existing group. For example, a gesture that drags a representation of one audio player to another audio player can be associated with an instruction to form a new group from the dragged audio player and the dragged-to audio player. In another example, a gesture that drags a representation of a grouped audio player out of its group can be associated with a user instruction to remove the dragged audio player from the group. Further examples of gestures that can be associated with arrangements for audio playback are discussed herein in connection with FIGS. 3-9. Once a new, modified arrangement for audio playback is identified via the module 148, the indication of the current audio playback arrangement 143 is updated to reflect the change and the playback instruction/synchronization module 147 generates instructions to the audio distribution network 110 to reflect the modified arrangement.

According to some embodiments of the present disclosure, the arrangement for audio playback, including membership in groups for synchronized playback, can be dynamically configured according to gesture inputs from the touch-sensitive display 134. In an example operation, the search/browse audio content module 149 can be employed to select audio content for playback on one or more of the audio players 112-116 in the audio distribution network 110. The display playback arrangement module 146 can cause the touch-sensitive display 134 to portray the current arrangement for audio playback (e.g., a list of available players including indications of currently playing audio content and any grouped arrangements among players). The gesture recognition module 145 can detect a gesture input received via the touch-sensitive display 134. The update playback arrangement module 148 can associate the gesture with a modified arrangement for audio playback from the audio distribution network 110.

For example, the update playback arrangement module 148 can associate a received gesture with an arrangement that forms a new group for synchronized playback, deletes a pre-existing group for synchronized playback, and/or revises membership in a pre-existing group. The playback instruction/synchronization module 147 can then generate instructions 131 for playback according to the modified arrangement for audio playback determined in the update playback arrangement module 148. The instructions 131 can be communicated via the network interface 138 to the audio distribution network 110 and/or the local network 150 to instruct the audio players 112-116 to provide audio playback according to the modified arrangement. In some examples, data indicating the current arrangement for audio playback is stored locally (143) in the memory 140 of the controller 130, but can also be stored externally (e.g., on a memory located on the local network 150 and/or audio distribution network 110) so as to be accessible to the controller 130 via the network interface 138. The display playback arrangement module 146 can then cause the display panel to portray the modified arrangement for audio playback, reflecting any changes in audio content and/or groups for synchronized playback.

The software implemented modules are described separately according to the functions of each for purposes of convenience in explanation. However, it is noted that one or more of the separately described modules can be combined together in a single set of executable code instructions. Similarly, any of the software modules can be divided in separate sets of executable code instructions that can be combined together to provide the functions described. Moreover, it is noted that at least some of the functions described herein as software-implemented can be implemented via hardware components, such as logic-based circuits, etc.

The controller 130 can be implemented in a variety of form factors. In some instances, the controller 130 can be implemented as an application (e.g., software) operating on a handheld computing device, such as a phone, portable digital music player, tablet computing device, or other handheld computing platform with wireless network connectivity. In some embodiments, the controller 130 can be implemented as a standalone special purpose computing device (e.g., hardware) including a touch-sensitive display user interface. In some embodiments, the controller 130 can be implemented in a computing device that is not configured to be handheld and/or portable, such as a module with a touch-sensitive display user interface that is hardwired to provide a power supply and network connectivity, for example.

Figure 2:
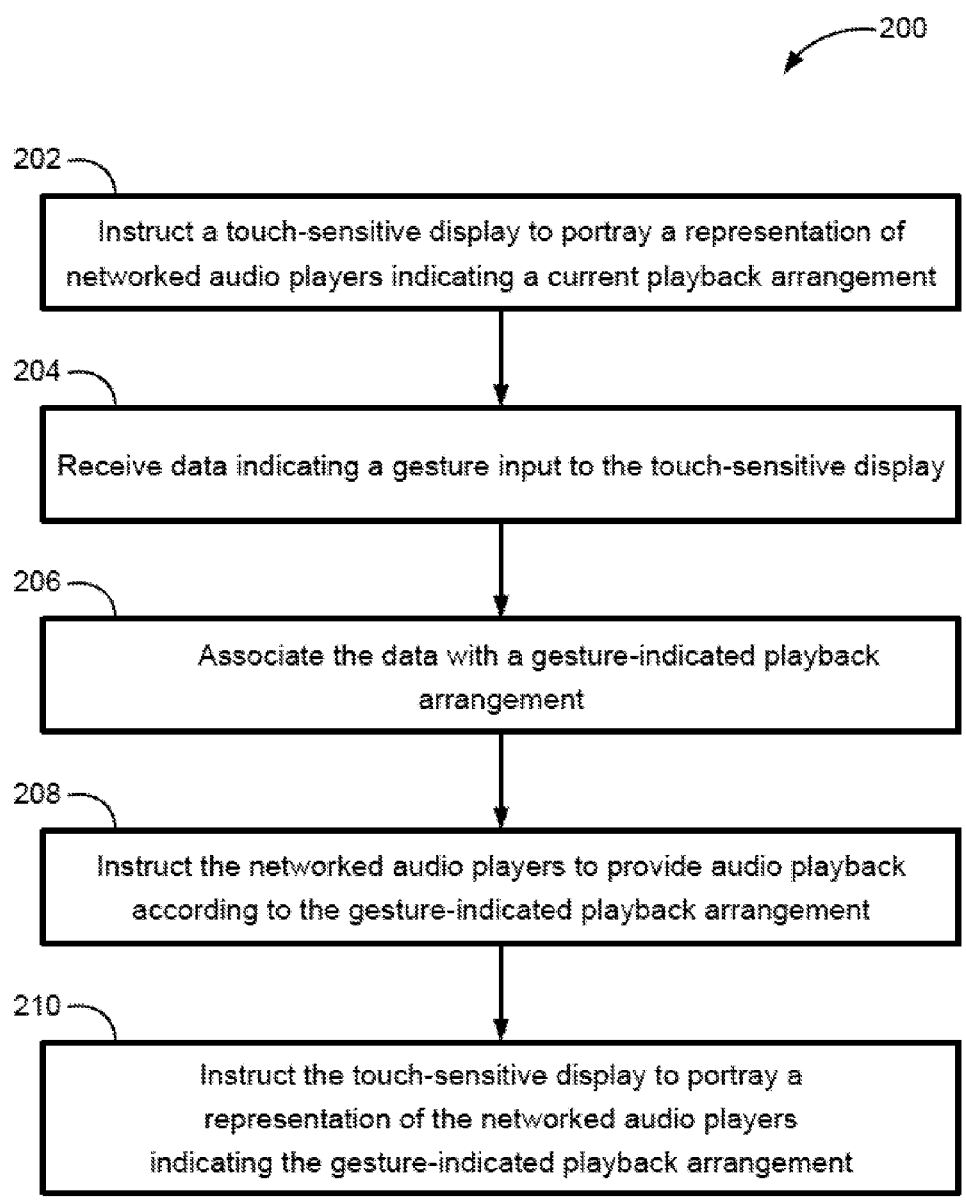
FIG. 2 is a flowchart of a process for selectively grouping the players to provide coordinated audio content based on gestures detected via the touch-sensitive display user interface.

FIG. 2 is a flowchart of a process 200 for selectively grouping audio players to provide coordinated audio content according to a gesture-indicated playback arrangement. The touch-sensitive display 134 is instructed to portray a representation of networked audio players indicating the current playback arrangement (202). The display instructions (e.g., display driver signals) can be generated by, for example, the display playback arrangement module 146. The portrayal of the current playback arrangement can include a representation for each available audio player (or a subset of available audio players) arranged to indicate audio content playing on each and any groups among the players. Each audio player can be associated with a non-overlapping region of the display panel and the regions associated with each audio player can optionally be surrounded by a visually distinctive border. The region can include text and/or images to associate the region of the display with a particular audio player.

Data is received indicating a gesture input to the touch-sensitive display (204). The data can be provided by, for example, the gesture recognition module 145. The data includes information to specify the gesture received via the touch-sensitive display, such as information characterizing the path traced on the touch-sensitive display 134 by a swipe or drag gesture and/or the speed of any such swiping or dragging. The data can also indicate multi-touch gestures, such as a pinch, squeeze, splay, expand, minimize, tap etc.

The data indicating the received gesture is associated with a gesture-indicated playback arrangement (206). The association with a playback arrangement can be carried out by, for example, the update playback arrangement module 148. In some embodiments, a drag gesture is used to move an audio player into or out of a group for synchronized playback. Individual audio players can be associated with distinct non-overlapping regions of the touch-sensitive display and audio players can be dynamically configured in groups (or removed from groups) according to origination and termination points of drag gestures. The origination point of a drag gesture can be the point of first contact by a single touch point on the touch-sensitive display 134. The termination point of a drag gesture can be the final point of contact following substantially continuous contact as the single touch point is swept across the touch-sensitive display. The origination and termination points can each be associated either with an audio player or with a group of audio players. In some embodiments, drag gestures that drag an ungrouped audio player to another audio player cause the two players to be grouped together for coordinated ("synchronized") playback. In some embodiments, drag gestures that drag an ungrouped player to a pre-existing group cause the dragged player to be added to the group. In some embodiments, drag gestures that drag a grouped player outside of its group cause the player to be removed from the group. Examples of associating a gesture with a modified playback arrangement are described herein in connection with FIGS. 3-9.

The audio players are instructed to provide audio playback according to the gesture-indicated playback arrangement (208). Instructions 131 can be generated by, for example, the playback instruction/synchronization module 147. The touch-sensitive display 134 is instructed to portray a representation of the networked audio players indicating the gesture-indicated playback arrangement (210). Similar to block 202, the display instructions (e.g., display driver signals) can be generated by, for example, the display playback arrangement module 146. The portrayal provided at block 210 can include modifications in the arrangement of the representations of each audio player to reflect the gesture-indicated arrangement for audio playback, including any updates in group membership, etc.

As discussed herein, a drag ("swipe") gesture is characterized according to the origination and termination locations of the gesture on the touch-sensitive display 134. When the touch-sensitive display portrays representations of available audio players in distinct regions of the display panel, the origination and terminal points can each be associated with an available audio player and/or a group of audio players. Thus, the present disclosure refers to "dragged audio players" as audio players associated with the origination position of a drag gesture. Similarly, the present disclosure refers to "dragged-to audio players" as audio players associated with terminal position of a drag gesture. In addition, for convenience in explanation, the present disclosure also refers to dragging audio players to other audio players to describe an operation where a drag gesture originates at a position of the display associated with one audio player and terminates at a position of the display associated with another audio player.

FIG. 3A is a flowchart of a process for creating a group via the touch-sensitive display user interface. A gesture is identified as dragging a first ungrouped networked audio player to a second networked audio player (302). The drag gesture can be identified and associated with the first and second ungrouped networked audio players by, for example, the update playback arrangement module 148. The origination and termination locations of the drag gesture can be associated with distinct regions of the touch-sensitive display associated with the first and second networked audio players, respectively. A group is formed for synchronous playback that includes the first and second networked audio players (304), which can also be implemented by, for example, the update playback arrangement module 148. Data indicating the updated arrangement for audio playback (143) can be stored in the memory 140 or another location accessible to the controller 130. Audio playback from the first and second networked audio players in the new group is synchronized with audio previously playing on the first audio player (306). Thus, the audio content on the first player can be extended to the second player. In some embodiments, a program setting can cause the audio content synchronously played on the new group to be audio content previously playing on the second audio player. Additionally or alternatively a user prompt can be generated to allow selection of audio content for playback on the new group.

FIG. 3B is an example embodiment of the touch-sensitive display with overlaid gesture indicators illustrating an example of the process for creating a group. A screenshot 311 portrays a representation of multiple audio players each associated with a distinct audio zone (e.g., a room or outdoor listening area of a home). The screenshot 311 also includes audio control features including a mute button 332, a volume control bar 334 and a pause button 336. The audio control features are provided for purposes of illustration only and some embodiments of the present disclosure can optionally provide greater or fewer audio control features, or even none at all.

In the example embodiment provided for explanation purposes, there are six separately controllable audio players each associated with a separate audio zone of a house. A kitchen listening zone is represented by a region of the display (320) surrounded by a visually distinctive border. The kitchen region 320 also includes an image icon 320a, which can be an image of the kitchen room or another optionally user-selected image associated with the kitchen. A text room identifier 320b labels the region 320 as "Kitchen," and an audio source identifier 320c labels the audio source for playback as "Satellite Radio-Station." The identifiers 320a-b allow a user to associate the region 320 of the display with a networked audio player in the kitchen and the identifier 320c indicates the current playback audio source on that audio player. Additional rooms and substantially distinct acoustic regions are represented by a family room region 322, a porch region 324, a deck region 326, a pool region 328, and a patio region 330. In the example provided, some of the rooms are not currently playing back audio content, as indicated by the absence of an audio source indicator in the porch region 324 and patio region 330, for example. The regions 320-330 representing each of the available audio players can be defined by non-overlapping visually distinctive boundaries to allow a user to associate regions within each boundary with the rooms indicated by the text and/or image indicators (e.g., the indicators 320a, 320b).

In addition, gesture indicators are included to indicate a drag gesture. The origination pointer 340 illustrates a single touch point on the touch-sensitive display 134 in the deck region 326. The touch point indicated by the origination pointer 340 is the origination location of a drag gesture that is dragged along a path 342 to terminate at the termination location indicated by the termination pointer 344. The termination location is a single touch point on the touch-sensitive display 134 in the pool region 328. Thus the gesture indicators 340-344 illustrate a drag gesture that originates in the deck region 326 and terminates in the pool region 328.

It is noted that the gesture indicators 340-344 (and similar gesture indicators illustrated elsewhere herein) are provided for illustration purposes only and do not in any way limit the form of the gesture input that can be interpreted by the system 100. For example, while the origination and termination pointers 340, 344 are illustrated as a right hand with index finger extended, an actual gesture can be input by a user's left ring finger, for example, and whereas the path 342 takes a generally straight line, an actual gesture path can have multiple curves and even loops. In sum, the touch gesture indicators 340-344 illustrate a drag gesture includes a single touch point (as indicated by the single extended finger) with an origination point 326 in the deck region 326 and a termination location in the pool region 328.

The drag gesture illustrated by the indicators 340-344 is detected via the gesture detection module 145. The update playback arrangement module 148 associates the gesture with forming a new group including networked audio players at the deck and pool. The playback instruction/synchronization module 147 generates instructions 131 to the deck and pool audio players to synchronously playback the audio content previously playing on the deck audio player (the dragged player). Alternatively, the procedure can be carried out to generate instructions 131 to the deck and pool audio players to synchronously playback audio content previously playing on the pool audio player (the dragged-to player). The behavior to select playback audio content previously playing on the dragged player or the dragged-to player can be set according to a user-adjustable setting, a dynamically generated user prompt, etc.

FIG. 3C is an example embodiment of the touch-sensitive display following creation of the group as indicated in FIG. 3B. A screenshot 312 shows the display following the creation of the group. The deck and pool audio players are represented by a deck region 352 and a pool region 354, respectively. Each of the deck and pool regions 352, 354 include a visually distinctive border encompassed by an outside group region 350. The outside group region 350 represents the newly formed group in response to the gesture illustrated in FIG. 3B. The outside group region includes a text identifier 350a and an audio source indicator 350b to allow a user to associate the group region 350 with the group including both the deck and pool and to identify the audio content being played in the group. In some examples one or more images can be included to indicate the group and/or audio source, such as an album cover, logo associated with an audio stream, etc. The outside group region 350 includes a visually distinctive border that can optionally entirely encompass the borders of the deck and pool regions 352, 354 to visually indicate that the group 350 includes both the deck audio player and the pool audio player.

FIG. 4A is a flowchart of a process 400 for adding audio players to a group via the touch-sensitive display user interface. A gesture is identified as dragging a first ungrouped networked audio player to a group (402). The drag gesture can be identified and associated with the first and second ungrouped networked audio players by, for example, the update playback arrangement module 148. The origination and termination locations of the drag gesture can be associated with distinct regions of the touch-sensitive display associated with the first audio players and the group, respectively. The first audio player is added to the group (404), which can also be implemented by, for example, the update playback arrangement module 148. Data indicating the updated arrangement for audio playback (143) can be stored in the memory 140 or another location accessible to the controller 130. Audio playback from the supplemented group is synchronized with audio previously playing on the group (406). In some embodiments, a program setting can cause the audio content synchronously played on the supplemented group to be audio content previously playing on the dragged audio player. Additionally or alternatively a user prompt can be generated to allow selection of audio content for playback on the supplemented group.

FIG. 4B is an example embodiment of the touch-sensitive display user interface with overlaid gesture indicators illustrating an example of the process for adding players to a group. A screenshot 411 shows the group region 350 described previously in connection with FIG. 3C. Gesture indicators 420-424 illustrate a drag gesture originating in the porch region 324 and terminating in the group region 350. The origination pointer 420 indicates that the drag gesture originates with a single touch point in the porch region 324; and the termination pointer 424 indicates that the drag gesture terminates with a single touch point in the outside group region 350. The path 422 indicates that the drag gesture starts in the porch region 324 and ends in the outside group region 350.

The drag gesture illustrated by the indicators 420-424 is detected via the gesture detection module 145. The update playback arrangement module 148 associates the gesture with adding the networked audio player at the porch to the previously formed group including the deck and pool audio players. The playback instruction/synchronization module 147 generates instructions 131 to the porch, deck, and pool audio players to synchronously playback the audio content previously playing on the group (the deck and pool audio players).

FIG. 4C is an example embodiment of the touch-sensitive display following adding players to the group as indicated in FIG. 4B. A screenshot 412 shows the display following adding the porch audio player to the group. An enlarged outside group region 430 includes a visually distinctive border surrounding representations of the players in the group. A text group identifier 430a and an audio source identifier 430b allow a user to associate the enlarged group region 430 with an outside group of audio players and identify the audio content being played on the players in the group. The porch audio player is represented by a porch region 432, and the deck and pool audio players are represented by a deck region 434 and a pool region 436, respectively. In some examples one or more images can be included to indicate the group and/or audio source, such as an album cover, logo associated with an audio stream, etc. The outside group region 430 includes a visually distinctive border that can optionally entirely encompass the borders of the porch, deck, and pool regions 432-436 to visually indicate the membership of the outside group.

FIG. 5A is a flowchart of a process 500 for joining all available players to a single group via the touch-sensitive display user interface. A gesture is identified as a squeeze or pinch gesture (502). The gesture recognition module 145 can identify the squeeze or pinch gesture based on two or more points of contact that are initially apart and move generally together on the touch-sensitive display 134. For example a thumb and one or more fingers can contact the display while spread apart and then be brought together while the thumb and one or more fingers are in substantially continuous contact with the touch-sensitive display 134. The squeeze gesture can be identified and associated with combining all available audio players into a single group by, for example, the update playback arrangement module 148. All available players are combined to form the group (504), which can also be implemented by, for example, the update playback arrangement module 148. Creating the single group of all available players can optionally include deleting any pre-existing groups. Data indicating the updated arrangement for audio playback (143) can be stored in the memory 140 or another location accessible to the controller 130. Audio playback from the created single group is synchronized (506). In some instances, the audio content played on all players in the single group is audio content previously playing on the most-recently selected player (e.g., an active player). In some embodiments, the most-recently selected player ("active player") can be a player displayed at the top (or other pre-determined location) of the list of available audio players on the touch-sensitive display. The most-recently selected player can additionally or alternatively be a player most recently selected to adjust volume and/or select a source of audio content for playback. Additionally or alternatively a user prompt can be generated to allow selection of audio content for playback on the created group of all available players.

FIG. 5B is an example embodiment of the touch-sensitive display user interface with overlaid squeeze gesture indicators illustrating an example of the process for joining all available players to a single group. A screenshot 511 shows representations of the available audio players 320-330. Gesture indicators 520, 522 illustrate a squeeze gesture. The open hand 520 illustrates an initial portion of a squeeze gesture where a hand is open with multiple points of contact with the display. The closed hand 522 illustrates a final portion of a squeeze gesture where the hand is closed, and the fingers contacting the display are brought together. The squeeze gesture can be detected by, for example, the gesture detection module 145. The gesture can be associated with an arrangement where all players are grouped together for synchronized play by, for example, the update playback arrangement module 148. A single group including all available players can be formed, and an indication of the updated group membership can be stored (143) in the memory 140 or another accessible location. The players in the new group (i.e., all available players) synchronously playback the same audio content from each player (e.g., via instructions 131 generated by the playback instruction/synchronization module 147).

FIG. 5C is an example embodiment of the touch-sensitive display following grouping all available players as indicated in FIG. 5B. A screenshot 512 shows the display after forming the single group. The display includes a group region 530 with a visually distinctive border encompassing non-overlapping regions associated with each of the audio players in the group. A kitchen region 532 is associated with the kitchen audio player; a family room region 534 is associated with the family room audio player; a porch region 536 is associated with the porch audio player; a deck region 538 is associated with the deck audio player; a pool region 540 is associated with the pool audio player; and a patio region 542 is associated with a patio audio player. The all-player group region 530 includes a text indicator 530*a* and an audio source indicator 530*b* to label the group and indicate the audio source being played back by the players in the group. Joining all available audio players for synchronous playback of a common audio content source, as described in connection with FIGS. 5B and 5C, can be referred to as a "party mode."

FIG. 6A is a flowchart of a process 600 for individually removing players from a group via the touch-sensitive display user interface. A gesture is identified as dragging a grouped networked audio player to a region of the display not associated with its group (602). The drag gesture can be identified and associated with the grouped audio players by, for example, the update playback arrangement module 148. The origination and termination locations of the drag gesture can be associated with distinct regions of the touch-sensitive display associated with the first audio player and a region not associated with the group, respectively. The first audio player is removed from the group (604), which can also be implemented by, for example, the update playback arrangement module 148. Data indicating the updated arrangement for audio playback (143) can be stored in the memory 140 or another location accessible to the controller 130. Audio playback from the removed player is ceased (606). Where the revised group includes multiple audio players, even after removing the first audio player, playback on the remaining players can continue uninterrupted. Where the revised group includes a single audio player after removing the first audio player, playback on the remaining player can continue uninterrupted or can be ceased. In some embodiments, a user-adjustable program setting or a dynamically generated user prompt can cause the audio content on remaining players to either cease or continue uninterrupted.

FIG. 6B is an example embodiment of the touch-sensitive display user interface with overlaid gesture indicators illustrating an example of the process for individually removing a player from a group. A screenshot 611 shows the group region 350 described previously in connection with FIG. 3C. Gesture indicators 620-624 illustrate a drag gesture originating in the deck region 352 and terminating in a location outside the group region 350. An origination pointer 620 indicates that the drag gesture originates with a single touch point in the deck region 352, which is itself encompassed in the group region 350. A termination pointer 624 indicates that the drag gesture terminates with a single touch point not in the group region 350 (e.g., at a location outside the visually distinctive boundary of the group region 350). The path 622 indicates that the drag gesture starts in the deck region 352 and ends outside the group region 350.

The drag gesture illustrated by the indicators 620-624 is detected via the gesture detection module 145. The update playback arrangement module 148 associates the gesture with removing the networked audio player at the deck from the group including the deck and pool audio players. The update playback arrangement module 148 can then delete the outside group, because removing the deck audio player leaves only the pool audio player. The playback instruction/synchronization module 147 can generate instructions 131 conveyed to the deck and pool audio players to cease playback on the deck and pool audio players. The instructions 131 can optionally specify that playback continue uninterrupted on one or both of the deck or pool audio players, as specified by a user setting and/or user prompt.

FIG. 6C is an example embodiment of the touch-sensitive display user interface with overlaid gesture indicators illustrating another example of the process for individually removing a player from a group. A screenshot 612 shows the group region 350 described previously in connection with FIG. 3C. Gesture indicators 630-634 illustrate a swipe gesture originating at one side of the deck region 352 and moving across the deck region 352 to expose a remove button 640. An origination pointer 630 indicates that the swipe gesture originates with a single touch point at one side of the deck region 352. A termination pointer 634 indicates that the swipe gesture terminates with a single touch point closer to an opposite side of the deck region 352. The path 632 indicates that the swipe gesture moves from left to right and is substantially contained within the deck region (e.g., the path 632 of the swipe gesture does not travel significantly out of the boundary of the deck region 352).

The swipe gesture illustrated by the indicators 630-634 is detected via the gesture detection module 145. Upon recognizing the swipe gesture, the remove button 640 is revealed. In some embodiments, the remove button 640 can be revealed only for a set duration following recognition of a swipe gesture. If the remove button 640 is pressed, the update playback arrangement module 148 associates the swipe gesture and subsequent press of the remove button 640 with an instruction to removing the networked audio player at the deck from the group including the deck and pool audio players. The update playback arrangement module 148 can then delete the outside group, because removing the deck audio player leaves only the pool audio player. The playback instruction/synchronization module 147 can generate instructions 131 conveyed to the deck and pool audio players to cease playback on the deck and pool audio players. The instructions 131 can optionally specify that playback continue uninterrupted on one or both of the deck or pool audio players, as specified by a user setting and/or user prompt.

FIG. 7A is a flowchart of a process 700 for breaking all existing groups via the touch-sensitive display user interface. A gesture is identified a splay gesture (702). The gesture recognition module 145 can identify the splay gesture based on two or more points of contact that are initially together and move generally apart on the touch-sensitive display 134. For example a thumb and one or more fingers can contact the display while together and then be spread apart while the thumb and one or more fingers are in substantially continuous contact with the touch-sensitive display 134. The splay gesture can be identified and associated with removing all players from any existing groups and/or deleting any existing groups and ceasing playback from all players, which can be implemented by, for example, the update playback arrangement module 148. All existing groups are deleted (704), which can also be implemented by, for example, the update playback arrangement module 148. Data indicating the updated arrangement for audio playback (143) can be stored in the memory 140 or another location accessible to the controller 130. Audio playback from the all players is ceased (706) by, for example, providing appropriate instructions 131 to the audio players via the playback instruction/synchronization module 147.

FIG. 7B is an example embodiment of the touch-sensitive display user interface with overlaid splay gesture indicators illustrating an example of the process for breaking all existing groups. In some embodiments, the splay gesture can be used when all players are joined in a single group (e.g., such as in the party mode discussed in connection with FIG. 5 above), to break apart all players and delete the single group. A screenshot 711 shows representations of the available audio players arranged in an all player group. The all player group region 530 includes indications of all available players. Gesture indicators 720, 722 illustrate a splay gesture. The closed hand 720 illustrates an initial portion of a splay gesture where a hand is closed with multiple points of contact with the display. The closed hand 722 illustrates a final portion of a splay gesture where the hand is open, and the fingers contacting the display are moved apart. The splay gesture can be detected by, for example, the gesture detection module 145. The gesture can be associated with an arrangement where all existing groups are deleted and all playback is ceased by, for example, the update playback arrangement module 148. The party group including all available players is deleted, and an indication of the updated playback arrangement can be stored (143) in the memory 140 or another accessible location. Playback can be ceased from each audio player (e.g., via instructions 131 generated by the playback instruction/synchronization module 147). Alternatively, where the splay gesture is used to break a group with all players (i.e., to stop party mode), playback can continue only on the single audio player that was active when the party mode group was initially formed. Such an active player can be, for example, the audio player at the top of the list of audio players on the touch-sensitive display and/or the audio player most recently actively controlled prior to initiation of the party mode (e.g., the audio player for which a source of audio content, volume, etc., was most recently controlled). Thus, the splay gesture can cause the audio distribution network 110 to revert to a playback arrangement preceding the initiation of the party mode (e.g., an arrangement where only the most-recently active player is playing back audio content). The splay gesture can thus be used to undo creation of a party mode group, by causing the system to revert back to its most recent playback arrangement preceding party mode.

FIG. 7C is an example embodiment of the touch-sensitive display following breaking all existing groups as indicated in FIG. 7B. A screenshot 712 shows the display after deleting all groups and ceasing playback. The display includes a representation of each audio player in an ungrouped, non-playing state. Each player is represented by a distinct region 730-740 of the touch-sensitive display and indications of currently playing audio content are absent from all regions to indicate no audio content is being played back by any of the players. A kitchen region 730 represents the kitchen player; a family room region 732 represents the family room player; a porch region 734 represents the porch player; a deck region 736 represents the deck player; a pool region 738 represents the pool player; and a patio region 740 represents the patio player.

FIG. 8A is a flowchart of a process 800 for ordering players on the touch-sensitive display user interface. A gesture is identified as dragging a first networked audio player to a region not associated with another networked audio player (802). The region can be, for example, at a location between representations of available players and/or groups of players. The location can be associated with a position on the display eligible for portraying a representation of the display. For example, where each player is represented by a block in a matrix, the location can be associated with a position in the matrix; where each player is represented by a horizontal bar arranged in a vertical stack, the location can be associated with a position in the vertical stack ("list") of bars. The drag gesture can be identified and associated with the first networked audio player and the location on the display by, for example, the update playback arrangement module 148. The origination and termination locations of the drag gesture can be associated with distinct regions ("locations") of the touch-sensitive display associated with the first audio players and the position, respectively. The display is updated with the first audio player re-positioned in the identified position (804). Where the first networked audio players is an ungrouped player such that moving the player to a new position does not also involve moving the player out of its current group, the update to the display can be implemented without changing the current playback arrangement (804). In some embodiments, the audio playback can continue without interruption from all existing players according to the current playback arrangement while the position of the first audio player is moved on the display according to the process 800. The process 800 thereby allows a user to selectively position representations of audio players on the touch-sensitive display 134 to increase accessibility and/or convenience in accessing particular audio players. For example, a frequently used audio player can be positioned near the top of the touch-sensitive display. In some embodiments, the current ordering and/or positions for each audio player representation can be stored in a memory, such as the memory 140 and/or another location accessible to the controller 130 via the network interface 138.

FIG. 8B is an example embodiment of the touch-sensitive display user interface with overlaid gesture indicators illustrating an example of the process for ordering players. A screenshot 811 shows representations of the available audio players 320-330. Gesture indicators 820-824 illustrate a drag gesture originating in the deck region 326 and terminating at a location between the pool region 328 and the patio region 330. The origination pointer 820 indicates that the drag gesture originates with a single touch point in the deck region 326; and the termination pointer 824 indicates that the drag gesture terminates with a single touch point in a region located between the pool and patio regions 328, 330 (e.g., outside the visually distinctive borders of both the pool and patio regions 328, 330). The path 822 indicates the general direction of the drag gesture. However, similar to the discussion of path indicators above, the particular path taken between the locations indicated by the pointers 820, 824 need not be a straight line and can be curved and/or include direction changes, etc.

The drag gesture illustrated by the indicators 820-424 is detected via the gesture detection module 145. The gesture is associated with positioning the deck region 326 in a position on the display associated with the end point of the drag gesture (e.g., between the pool and patio regions 328, 330). An indication of the position associated with the deck region 326 and/or the other regions 320-330 can be stored in a memory for future reference. The display playback arrangement module 146 updates the display to reflect the new position of the deck region 326 indicated by the drag gesture.

FIG. 8C is an example embodiment touch-sensitive display following the ordering players as indicated in FIG. 8B. A screenshot 812 shows representations of the available players 320-330 following ordering the players. The position of the deck region 326 is updated to a location between the pool region 328 and the patio region 330, rather than between the porch region 324 and the pool region 328, as in FIG. 8A.

Figure 9:
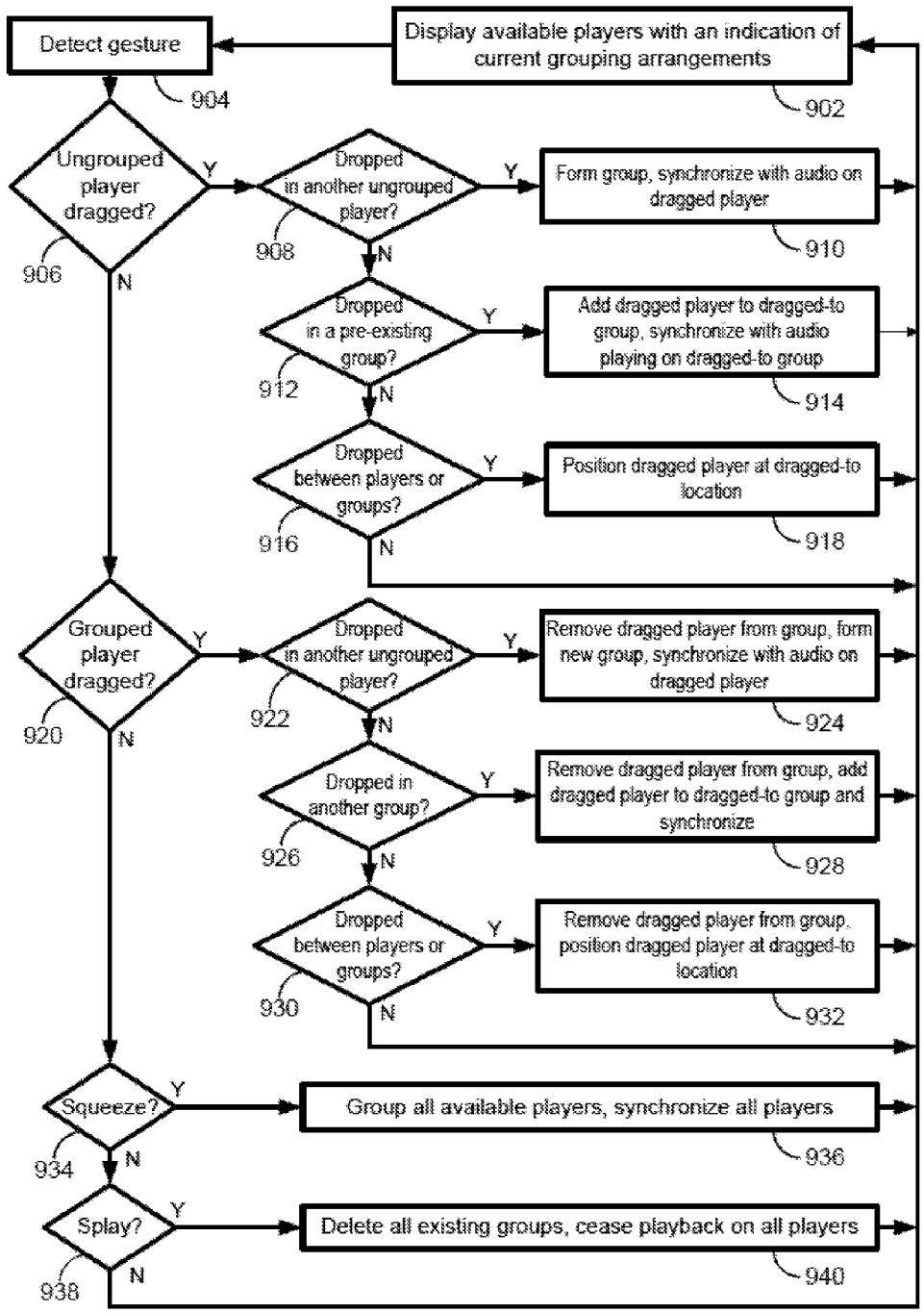
FIG. 9 is a flowchart of a process for dynamically adjusting groups according to gestures detected via the touch-sensitive display user interface.

FIG. 9 is a flowchart of a process 900 for dynamically adjusting groups according to gestures detected via the touch-sensitive display 134. A representation of available players is portrayed on the display panel in a manner that indicates the current playback arrangement (902). The display instructions can be provided by, for example, the display playback arrangement module 146. The display of the current playback arrangement can include indications of audio content on each audio player and/or grouping arrangement among players, such as in the example screenshots provided in FIGS. 3-8. A gesture input is detected via the touch-sensitive display 134 (904). The gesture (e.g., drag, splay, squeeze, etc.) can be detected, identified, and/or characterized by, for example, the gesture detection module 145.

The detected gesture is characterized and actions are carried out to modify a playback arrangement according to the detected gesture. For convenience in explanation the present disclosure refers to "dragging a player" to describe a drag gesture with an origination location in a region of the touch-sensitive display associated with the player. Similarly, the present disclosure refers to "dropping in a player" (or "dropping in a group," etc.) to describe a drag gesture with a termination location in a region of the touch-sensitive display associated with the player (or group, etc.).

The gesture is evaluated to determine modifications to the playback arrangement based on the gesture, if any. The evaluation can be performed by, for example, the update playback arrangement module 148. Where the gesture includes dragging an ungrouped player (906) to another ungrouped player (908), a new group is formed with the dragged and dragged-to player (910). The memory indicating the current playback arrangement 143 can be updated to reflect the new group. The audio content on the new group is synchronized (910), which can be performed by, for example, the playback instruction/synchronization module 147. The audio content played back synchronously on the new group can be the audio content previously playing the dragged player. The audio content provided on the new group can alternatively be the audio content previously playing on the dragged-to player. In some examples, a program setting and/or user prompt is provided to indicate which audio content should be synchronously played back on the newly formed group. Additionally or alternatively, the user interface 132 can prompt a user to select audio content to playback from the newly formed group, such as in cases where no audio content is previously playing from either the dragged or dragged-to players. The synchronization process can include ceasing playback of currently playback on one or both players to allow for the selected audio content to be synchronized. The display is updated to reflect the change in group membership (902). The procedure for forming a new group can be similar to the description of the process 300 in connection with FIG. 3 above.

Where the gesture includes dragging an ungrouped player (906) to a pre-existing group (912), the dragged player is added to the dragged-to group (914). The indication of the current playback arrangement 143 can be updated to reflect the change in group membership. The audio content on the supplemented group can be synchronized (e.g., according to instructions 131 generated by the playback instruction/synchronization module 147) so as to play audio content already playing on the dragged-to group. The controller 130 can additionally or alternatively be configured to provide a user prompt to select audio content for the supplemented group and/or be configured to synchronize with audio content on the dragged player rather than the dragged-to group, for example. The display is updated to reflect the change in group membership (902). The procedure for supplementing a group can be similar to the description of the process 400 in connection with FIG. 4 above.

Where the gesture includes dragging an ungrouped player (906) to a position on the display not associated with a player or group (916) (e.g., between players or groups), the representation of the dragged player can be re-located according to the dragged-to location (918). The display is updated to reflect the change in player location (902). In some embodiments, an indication of the location of each audio player representation on the display can be stored in memory (e.g., the memory 140 and/or another memory location accessible to the controller 130 via the network interface 138). The stored indication of audio player order, such as a list order, can then be used to display the available audio players in a manner that retains a user preference for player ordering (e.g., via the display playback arrangement module 146). In some embodiments, commonly used audio players can be placed, for example, near the top of a list of audio players to be more conveniently accessed. The re-location procedure can allow a user to drag representations of players so as to re-order the list of available audio players, similar to the discussion of the process 800 in connection with FIG. 8 above.

Where the gesture includes dragging an ungrouped player (906), but does not include dropping in another ungrouped player (908), dropping in a pre-existing group (912), or dropping between players or groups in a location associated with an available re-location position (916), the touch-sensitive display continues to display available players and playback arrangements (902) without modifying the playback arrangement. For example, where a drag gesture originates from a region associated with an ungrouped player (906), and terminates in a region of the touch-sensitive display not associated with the players, groups, or positions in the list of players/groups, such as a window of the display providing an entirely separate program, the playback arrangement is not updated, and the display continues to display playback arrangement information (902) and detect subsequent gestures (904).

Where the gesture includes dragging a grouped player (920) to another ungrouped player (922), the dragged player is removed from its group and a new group is formed with the dragged and dragged-to player (924). The memory indicating the current playback arrangement 143 can be updated to reflect the new group membership. Where the dragged-from group includes only one player after removing the dragged player, playback can cease on the remaining player or can continue without interruption according to a program setting and/or user prompt. Where the dragged-from group continues to include more than one player, even after removing the dragged player, audio content can continue to be played back on the remaining players without interruption. The audio content on the new group is synchronized (924 (e.g., according to instructions 131 generated by the playback instruction/synchronization module 147) so as to play audio content already playing on dragged player. The controller 130 can additionally or alternatively be configured to provide a user prompt to select audio content for the new group and/or be configured to synchronize with audio content on the dragged-to player rather than the dragged player, for example. The display is updated to reflect the change in group membership (902). The procedure for removing a selectable player from a group can be similar to the discussion of the process 600 in connection with FIG. 6 above.

Where the gesture includes dragging a grouped player (920) to another group (926), the dragged player is removed from its original group and added to the dragged-to group (928). The indication of the current playback arrangement 143 can be updated to reflect the change in group membership. Where the dragged-from group includes only one player after removing the dragged player, playback can cease on the remaining player or can continue without interruption according to a program setting and/or user prompt. Where the dragged-from group continues to include more than one player, even after removing the dragged player, audio content can continue to be played back on the remaining players without interruption. The audio content on the supplemented group can be synchronized (e.g., according to instructions 131 generated by the playback instruction/synchronization module 147) so as to play audio content already playing on the dragged-to group. The controller 130 can additionally or alternatively be configured to provide a user prompt to select audio content for the supplemented group and/or be configured to synchronize with audio content on the dragged player rather than the dragged-to group, for example. The display is updated to reflect the change in group membership (902). The procedure for removing a selectable player from a group can be similar to the discussion of the process 600 in connection with FIG. 6 above.

Where the gesture includes dragging a grouped player (920) to a position on the display not associated with a player or group (930) (e.g., between players or groups), the representation of the dragged player can be re-located according to the dragged-to location (932). The dragged player is removed from its group (932). The indication of the current playback arrangement 143 can be updated to reflect the change in group membership. The display is updated to reflect the change in player location and group membership (902). Although, the dragged player can also be dropped in a location within its original group, but at a location associated with a different location in the group region, in which case the dragged player is not removed from its group. Instead, the display can be updated (902) to reflect a new order of audio player representations within the group. In some embodiments, an indication of the location of each audio player representation on the display can be stored in memory (e.g., the memory 140 and/or another memory location accessible to the controller 130 via the network interface 138). The stored indication of audio player order, such as a list order, can then be used to display the available audio players in a manner that retains a user preference for player ordering (e.g., via the display playback arrangement module 146). In some embodiments, commonly used audio players can be placed, for example, near the top of a list of audio players to be more conveniently accessed. The re-location procedure can allow a user to drag representations of players so as to re-order the list of available audio players, similar to the discussion of the process 800 in connection with FIG. 8 above.

Where the gesture includes dragging a grouped player (920), but does not include dropping in another ungrouped player (922), dropping in another group (926), or dropping between players or groups in a location associated with an available re-location position (930), the touch-sensitive display continues to display available players and playback arrangements (902) without modifying the playback arrangement. For example, where a drag gesture originates from a region associated with a grouped player (920), and terminates in a region of the touch-sensitive display not associated with the players, groups, or positions in the list of players/groups, such as a window of the display providing an entirely separate program, the playback arrangement is not updated, and the display continues to display playback arrangement information (902) and detect subsequent gestures (904).

Where the gesture includes a squeeze or pinch gesture (934), all available players are grouped in a single group and the playback from all players is synchronized (936). Where the playback arrangement prior to detecting the squeeze gesture includes one or more groups, the groups can be automatically deleted to allow for creation of the new single group that joins all available players. The audio content synchronously provided by the new group can be audio content provided on the most-recently selected audio player or group. Of course, the user interface 132 can additionally or alternatively be configured to provide a user prompt to select audio content for the new group. The squeeze or pinch gesture can therefore provide a single gesture input to join all available audio players to synchronously playback common audio content in a "party mode." The display is updated to reflect the change in group membership (902). The procedure for grouping all players with a squeeze or pinch gesture can be similar to the discussion of the process 500 in connection with FIG. 5 above.

Where the gesture includes a splay gesture (938), all existing groups are deleted, and playback from all players is ceased (940). Detection of the splay gesture (938) causes all available players to be ungrouped and not playing any music. The splay gesture can therefore provide a single gesture input to turn off all playing music and reset the playback arrangement of all available audio players to ungrouped. The display is updated to reflect the change in group membership (902). The procedure for grouping all players with a splay gesture can be similar to the discussion of the process 700 in connection with FIG. 7 above.

In some embodiments of the present disclosure, a user interface with a touch-sensitive display provides an interface to allow a user to dynamically configure a playback arrangement for a group of networked audio players. In some embodiments of the present disclosure, a single gesture input, such as a drag gesture, a splay gesture, a squeeze gesture, pinch gesture, etc., can cause the system 100 to form a group for synchronous playback with selectable members, add selectable players to an existing group, remove selectable players from an existing group, join all players in a single group, remove all players from existing groups, etc. The present disclosure therefore provides for efficiently managing playback arrangements in a networked audio distribution system.

Furthermore, by providing for forming and/or editing groups via a single display screen of available players that indicates group membership, representations of available players can be substantially continuously displayed while groups are formed and/or edited without requiring additional menus to appear on the touch-sensitive display 134. Such an efficient system for single-gesture-based playback arrangement management contrasts with systems having multiple sub-menus. For example, a multi-step system can require a user to first select a player to be a member of a group from a first window, which opens a new window listing available players to be joined to the first player, then select from among players to join, and then returns to a view that allows for selection of audio content, etc.

Figure 10:
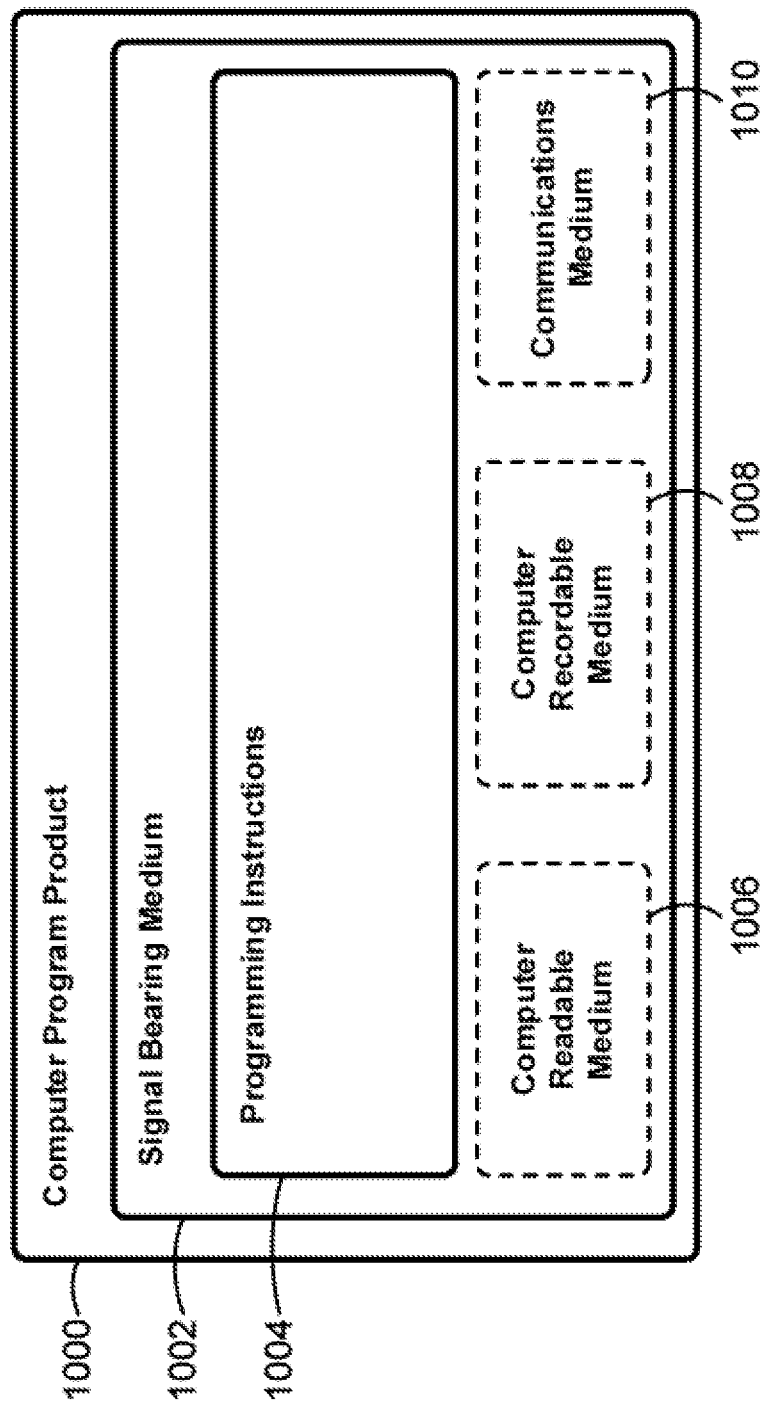
FIG. 10 depicts a computer-readable medium configured according to an example embodiment.

FIG. 10 depicts a computer-readable medium configured according to an example embodiment. In example embodiments, the example system can include one or more processors, one or more forms of memory, one or more input devices/interfaces, one or more output devices/interfaces, and machine-readable instructions that when executed by the one or more processors cause the system to carry out the various functions, tasks, capabilities, etc., described above.

As noted above, in some embodiments, the disclosed techniques can be implemented by computer program instructions encoded on a non-transitory computer-readable storage media in a machine-readable format, or on other non-transitory media or articles of manufacture (e.g., the executable instructions 144 stored on the memory 140 of the controller 130). FIG. 10 is a schematic illustrating a conceptual partial view of an example computer program product that includes a computer program for executing a computer process on a computing device, arranged according to at least some embodiments presented herein.

In one embodiment, the example computer program product 1000 is provided using a signal bearing medium 1002. The signal bearing medium 1002 can include one or more programming instructions 1004 that, when executed by one or more processors can provide functionality or portions of the functionality described above with respect to FIGS. 1-9. In some examples, the signal bearing medium 1002 can be a computer-readable medium 1006, such as, but not limited to, a hard disk drive, a Compact Disc (CD), a Digital Video Disk (DVD), a digital tape, memory, etc. In some implementations, the signal bearing medium 1002 can be a computer recordable medium 1008, such as, but not limited to, memory, read/write (R/W) CDs, R/W DVDs, etc. In some implementations, the signal bearing medium 1002 can be a communications medium 1010, such as, but not limited to, a digital and/or an analog communication medium (e.g., a fiber optic cable, a waveguide, a wired communications link, a wireless communication link, etc.). Thus, for example, the signal bearing medium 1002 can be conveyed by a wireless form of the communications medium 1010.

The one or more programming instructions 1004 can be, for example, computer executable and/or logic implemented instructions. In some examples, a computing device such as the controller 130 of FIGS. 1A and 1B is configured to provide various operations, functions, or actions in response to the programming instructions 1004 and/or the executable instructions 144 conveyed to the processor 136 by one or more of the computer readable medium 1006, the computer recordable medium 1008, and/or the communications medium 1010.

The non-transitory computer readable medium could also be distributed among multiple data storage elements, which can be remotely located from each other. The computing device that executes some or all of the stored instructions can be a handheld device, such as a personal phone, tablet, etc. Alternatively, the computing device that executes some or all of the stored instructions can be another computing device, such as a server.

Because many modifications, variations, and changes in detail can be made to the described embodiments, it is intended that all matters in the preceding description and shown in the accompanying drawings be interpreted as illustrative and not in a limiting sense. Further, it is intended to be understood that the following clauses further describe aspects of the present disclosure.

(1) A method for arranging a plurality of networked audio players according to input from a touch-sensitive display, the method comprising:

instructing the touch-sensitive display to portray a representation of at least a portion of the plurality of networked audio players;

receiving data indicative of a gesture input via the touch-sensitive display;

associating the received data with a gesture-indicated arrangement for audio playback from the plurality of networked audio players;

instructing the plurality of networked audio players to provide audio playback according to the gesture-indicated arrangement; and instructing the touch-sensitive display to portray a representation of at least some of the plurality of networked audio players including an indication of the gesture-indicated arrangement.

(2) The method according to clause (1), wherein the instructing the touch-sensitive display is carried out such that representations of at least a portion of the plurality of networked audio players are substantially continuously portrayed via the touch-sensitive display during the receiving input data, the associating the received data with a gesture-indicated arrangement, and the instructing the plurality of networked audio players.

(3) The method according to clause (1) or (2), further comprising:

responsive to the gesture-indicated arrangement including forming or supplementing one or more groups for coordinated playback, synchronizing audio playback from ones of the plurality of networked audio players associated together in the formed or supplemented one or more groups; and responsive to the gesture-indicated arrangement including removing networked audio players from pre-existing groups, ceasing playback from ones of the plurality of networked audio players removed from the pre-existing groups.

(4) The method according to any one of clauses (1) through (3), wherein the received data indicates that the gesture includes dragging a representation of a first networked audio player to a region of the touch-sensitive display associated with a second networked audio player, wherein the second networked audio player is not associated with a pre-existing group, and wherein the controller instructs the networked audio players according to the gesture-indicated arrangement by:

forming a new group for coordinated audio playback including the first and second networked audio players, and synchronizing audio playback from the first and second networked audio players in the new group.

(5) The method according to any one of clauses (1) through (3), wherein the received data indicates that the gesture includes dragging a representation of a first networked audio player to a region of the touch-sensitive display associated with a pre-existing group including a second networked audio player and a third networked audio player, and wherein the controller instructs the networked audio players according to the gesture-indicated arrangement by:

adding the first networked audio player to the pre-existing group, and synchronizing audio playback from the first, second, and third networked audio players in the pre-existing group.

(6) The method according to any one of clauses (1) through (3), wherein the received data indicates that the gesture includes a squeeze or pinch gesture, and wherein the controller instructs the networked audio players according to the gesture-indicated arrangement by:

combining the plurality of networked audio players in a single group for coordinated audio playback; and synchronizing audio playback from the plurality of networked audio players.

(7) The method according to clause 6, further comprising:

following the synchronizing audio playback from the plurality of networked audio players, receiving data indicative of a splay gesture via the touch-sensitive display, and instructing the plurality of networked audio players to revert to providing audio playback according to a playback arrangement employed preceding the single group for coordinated audio playback.

(8) The method according to any one of clauses (1) through (3), wherein the received data indicates that the gesture includes dragging a representation of a first networked audio player included in a pre-existing group to a region of the touch-sensitive display not associated with the pre-existing group, and wherein the controller instructs the networked audio players according to the gesture-indicated arrangement by:

removing the first networked audio player from the pre-existing group; and ceasing audio playback from the first networked audio player.

(9) The method according to clause (8), wherein the pre-existing group further includes a second networked audio player and a third audio player; and wherein the controller further instructs the networked audio players according to the gesture-indicated arrangement by:

ceasing audio playback from the first networked audio player without interrupting audio playback from the second and third networked audio players in the pre-existing group.

(10) The method according to any one of clauses (1) through (3), wherein the received data indicates that the gesture includes dragging a representation of a first networked audio player included in a pre-existing group to a region of the touch-sensitive display not associated with the pre-existing group, wherein the pre-existing group includes only the first networked audio player and a second networked audio player, and wherein the controller instructs the networked audio players according to the gesture-indicated arrangement by:

deleting the pre-existing group; and ceasing audio playback from the first and second networked audio player.

(11) The method according to any one of clauses (1) through (3), wherein the received data indicates that the gesture includes a swipe across a representation of a first networked audio player associated with a pre-existing group, wherein the method further comprises:

responsive to the receiving, instructing the touch-sensitive display to portray a selectable button within a region associated with the first networked audio player; and wherein the instructing includes, responsive to receiving an indication that the selectable button is selected:

removing the first networked audio player from the pre-existing group; and ceasing audio playback from the first networked audio player.

(12) The method according to any one of clauses (1) through (3), wherein the received data indicates that the gesture includes a splay gesture, and wherein the controller instructs the networked audio players according to the gesture-indicated arrangement by:

deleting pre-existing groups, if any, associating one or more of the plurality of networked audio players together for coordinated audio playback; and ceasing audio playback from all of the plurality of networked audio players.

(13) The method according to any one of clauses (1) through (3), wherein the received data indicates that the gesture includes dragging a representation of a first networked audio player not associated with a pre-existing group to a region of the touch-sensitive display associated with a position on the display, wherein the region is not associated with any of the plurality of networked audio players, wherein the associating is carried out such that the gesture-indicated arrangement is unchanged from a previous arrangement for coordinated feedback, and wherein the instructing the touch-sensitive display to portray a representation of at least some of the plurality of the plurality of networked audio players responsive to the associating includes portraying the representation of the first networked audio player in the position of the display.

(14) A device for arranging a plurality of networked audio players, the device comprising:

a touch-sensitive display; and a controller configured to:

detect a gesture via the touch-sensitive display while the touch-sensitive display portrays a representation of at least some of a plurality of networked audio players;

associate the detected gesture with a gesture-indicated arrangement for audio playback from the plurality of networked audio players;

instruct the plurality of networked audio players to provide audio playback according to the gesture-indicated arrangement; and display, via the touch-sensitive display, a representation of at least some of the plurality of networked audio players including an indication of the gesture-indicated arrangement.

(15) The device according to clause (14), wherein the controller is further configured to substantially continuously portray the at least some of the plurality of networked audio players while detecting the gesture, associating the gesture, and instructing the plurality of networked audio players.

(16) The device according to clause (14) or (15), wherein the controller is further configured to:

responsive to the gesture-indicated arrangement including forming or supplementing one or more groups for coordinated playback, synchronize audio playback from ones of the plurality of networked audio players included together in the formed or supplemented one or more groups; and responsive to the gesture-indicated arrangement including removing networked audio players from pre-existing groups, cease playback from ones of the plurality of networked audio players removed from the pre-existing groups.

(17) The device according to any one of clauses (14) through (16), further comprising:

an antenna for wirelessly communicating with the plurality of networked audio players.

(18) A method comprising:

detecting a gesture via a touch-sensitive display while the touch-sensitive display displays a representation of at least some of a plurality of networked audio players;

associating the detected gesture with a gesture-indicated arrangement for audio playback from the plurality of networked audio players;

instructing the plurality of networked audio players to provide audio playback according to the gesture-indicated arrangement; and displaying, via the touch-sensitive display, a representation of at least some of the plurality of networked audio players including an indication of the gesture-indicated arrangement.

(19) The method according to clause (18), wherein the instructing includes:

responsive to the gesture-indicated arrangement including forming or supplementing one or more groups for coordinated playback, synchronizing audio playback from ones of the plurality of networked audio players associated together in the formed or supplemented one or more groups; and responsive to the gesture-indicated arrangement including removing networked audio players from pre-existing groups, ceasing playback from ones of the plurality of networked audio players removed from the pre-existing groups.

(20) The method according to clause (18) or (19), wherein representations of the at least some of a plurality of networked audio players are substantially continuously displayed via the touch-sensitive display while the detecting the gesture, associating the gesture, and displaying the representation are carried out.

(21) The method according to any one of clauses (18) through (20), wherein the associating includes:

identifying the detected gesture as dragging a representation of a first networked audio player to a region of the touch-sensitive display associated with a second networked audio player, wherein the second networked audio player is not associated with a pre-existing group, and wherein the instructing includes:

forming a new group for coordinated audio playback including the first and second networked audio players, and synchronizing audio playback from the first and second networked audio players in the new group.

(22) The method according to any one of clauses (18) through (20), wherein the associating includes:

identifying the detected gesture as dragging a representation of a first networked audio player to a region of the touch-sensitive display associated with a pre-existing group, wherein the pre-existing group includes second and third networked audio players, and wherein the instructing includes:

supplementing the pre-existing group to include the first networked audio player, and synchronizing audio playback from the first, second, and third networked audio players in the supplemented pre-existing group.

(23) The method according to any one of clauses (18) through (20), wherein the associating includes:

identifying the detected gesture as a squeeze gesture including multiple points of contact with the touch-sensitive display moving together, and wherein the instructing includes:

combining the plurality of networked audio players in a single group for coordinated audio playback; and synchronizing audio playback from the plurality of networked audio players.

(24) The method according to any one of clauses (18) through (20), wherein the associating includes:

identifying the detected gesture as dragging a representation of a first networked audio player included in a pre-existing group to a region of the touch-sensitive display not associated with the pre-existing group, and wherein the instructing includes:

removing the first networked audio player from the pre-existing group; and ceasing audio playback from the first networked audio player.

(25) The method according to any one of clauses (18) through (20), wherein the associating includes:

identifying the detected gesture as a splay gesture including multiple points of contact with the touch-sensitive display moving apart, and wherein the instructing includes:

deleting pre-existing groups, if any, associating one or more of the plurality of networked audio players together for coordinated audio playback; and ceasing audio playback from all of the plurality of networked audio players.

(26) The method according to any one of clauses (18) through (20), wherein the associating includes:

identifying the detected gesture as dragging a representation of a first networked audio player not associated with a pre-existing group to a region of the touch-sensitive display associated with a position on the display, wherein the region is not associated with any of the plurality of networked audio players, and wherein the displaying includes portraying the representation of the first networked audio player in the position of the display.

(27) The method according to any one of clauses (18) through (26), wherein the displayed representation includes a distinct region of the touch-sensitive display for each of the at least some of the plurality of networked audio players, and wherein a group associating two or more of the at least some of the plurality of networked audio players for coordinated audio playback is indicated by a visually apparent background surrounding only the two or more networked audio players included in the group.

(28) A system comprising:

a plurality of networked audio players each configured to playback audio content according to network-delivered instructions; and a controller including a user interface having a touch-sensitive display, wherein the controller is configured to:

detect a gesture via the touch-sensitive display while the touch-sensitive display portrays a representation of at least some of the plurality of networked audio players;

associate the detected gesture with a gesture-indicated arrangement for audio playback from the plurality of networked audio players;

instruct the plurality of networked audio players to provide audio playback according to the gesture-indicated arrangement; and display a representation of at least some of the plurality of networked audio players including an indication of the gesture-indicated arrangement for coordinated audio playback.

(29) The system according to clause (28), wherein the controller is further configured to:

responsive to the gesture-indicated arrangement including forming or supplementing one or more groups for coordinated playback, synchronize audio playback from ones of the plurality of networked audio players associated together in the formed or supplemented one or more groups;

responsive to the gesture-indicated arrangement including removing networked audio players from pre-existing groups, cease playback from ones of the plurality of networked audio players removed from the pre-existing groups.

(30) The system according to clause (28) or (29), wherein the controller is further configured to:

identify the detected gesture as dragging a representation of a first networked audio player to a region of the touch-sensitive display associated with a second networked audio player, wherein the second networked audio player is not associated with a pre-existing group, and wherein the controller instructs the networked audio players by:
    forming a new group for coordinated audio playback including the first and second networked audio players, and
    synchronizing audio playback from the first and second networked audio players in the new group.

(31) The system according to clause (30), wherein the controller is configured to synchronize audio playback from the first and second networked audio players by synchronously providing a source of audio content, if any, played on the first networked audio player prior to the detection of the gesture.

(32) The system according to any one of clauses (28) through (31), wherein the controller is further configured to:
    identify the detected gesture as a squeeze gesture including multiple points of contact with the touch-sensitive display moving together, and
wherein the controller instructs the networked audio players by:
    combining the plurality of networked audio players in a single group for coordinated audio playback; and
    synchronizing audio playback from the plurality of networked audio players.

(33) The system according to any one of clauses (28) through (32), wherein the controller is further configured to:
    identify the detected gesture as dragging a representation of a first networked audio player associated with a pre-existing group to a region of the touch-sensitive display not associated with the pre-existing group, and
wherein the controller instructs the networked audio players by:
    removing the first networked audio player from the pre-existing group; and
    ceasing audio playback from the first networked audio player.

(34) A computer readable medium storing instructions that, when executed by one or more processors in a computing device, cause the computing device to perform operations, the operations comprising:
    instructing a touch-sensitive display to portray a representation of at least a portion of a plurality of networked audio players;
    receiving input data indicative of a gesture input via the touch-sensitive display;
    associating the received data with a gesture-indicated arrangement for audio playback from the plurality of networked audio players;
    instructing the plurality of networked audio players to provide audio playback according to the gesture-indicated arrangement; and
    instructing the touch-sensitive display to portray a representation of at least some of the plurality of networked audio players including an indication of the gesture-indicated arrangement.

(35) The computer readable medium according to clause (34), wherein the instructing the touch-sensitive display is carried out such that representations of at least a portion of the plurality of networked audio players are substantially continuously portrayed via the touch-sensitive display during the receiving input data, the associating the received data with a gesture-indicated arrangement, and the instructing the plurality of networked audio players.

(36) The computer readable medium according to clause (34) or (35), wherein the operations further comprise:
    responsive to the gesture-indicated arrangement including forming or supplementing one or more groups for coordinated playback, synchronizing audio playback from ones of the plurality of networked audio players associated together in the formed or supplemented one or more groups; and
    responsive to the gesture-indicated arrangement including removing networked audio players from pre-existing groups, ceasing playback from ones of the plurality of networked audio players removed from the pre-existing groups.

While various example aspects and example embodiments have been disclosed herein, other aspects and embodiments will be apparent to those skilled in the art. The various example aspects and example embodiments disclosed herein are for purposes of illustration and are not intended to be limiting, with the true scope and spirit being indicated by the following claims.

The invention claimed is:

1. A method for arranging a plurality of networked audio players according to input from controller with a touch-sensitive display, the method comprising:
    instructing the touch-sensitive display to portray a representation of at least a portion of the plurality of networked audio players;
    receiving data indicative of a multi-touch gesture input involving two or more concurrent points of contact via the touch-sensitive display;
    associating the received data with a gesture-indicated arrangement for audio playback from the plurality of networked audio players;
    instructing the plurality of networked audio players to provide audio playback according to the gesture-indicated arrangement; and
    instructing the touch-sensitive display to portray a representation of at least some of the plurality of networked audio players including an indication of the gesture-indicated arrangement,
    wherein the data indicative of the multi-touch gesture input comprises data indicative of a splay gesture input that removes the plurality of networked audio players from a group, and a pinch gesture input or a squeeze gesture input that groups the plurality of networked audio players into the group.

2. The method according to claim 1, wherein the received data indicates that the multi-touch gesture includes a squeeze or pinch gesture, and wherein the controller instructs the networked audio players according to the gesture-indicated arrangement by: combining the plurality of networked audio players in a single group for coordinated audio playback; and synchronizing audio playback from the plurality of networked audio players.

3. The method according to claim 2, further comprising: following the synchronizing audio playback from the plurality of networked audio players, receiving data indicative of the splay gesture via the touch-sensitive display, and instructing the plurality of networked audio players to revert to providing audio playback according to a playback arrangement employed preceding the single group for coordinated audio playback.

4. The method according to claim 1, wherein the received data indicates that the multi-touch gesture includes a splay gesture, and wherein the controller instructs the networked audio players according to the multi-touch gesture-indicated arrangement by:
    deleting pre-existing groups, if any, associating one or more of the plurality of networked audio players together for coordinated audio playback; and
    ceasing audio playback from all of the plurality of networked audio players.

5. A method comprising:
   detecting a multi-touch gesture involving two or more concurrent points of contact via a touch-sensitive display while the touch-sensitive display displays a representation of at least some of a plurality of networked audio players;
   associating the detected multi-touch gesture with a gesture-indicated arrangement for audio playback from the plurality of networked audio players;
   instructing the plurality of networked audio players to provide audio playback according to the gesture-indicated arrangement; and
   displaying, via the touch-sensitive display, a representation of at least some of the plurality of networked audio players including an indication of the gesture-indicated arrangement,
   wherein the data indicative of a gesture input comprises data indicative of a splay gesture input that removes the plurality of networked audio players from a group, a pinch gesture input or a squeeze gesture input that groups the plurality of networked audio players into the group.

6. The method according to claim 5, wherein the associating includes:
   identifying the detected multi-touch gesture as a squeeze gesture including multiple points of contact with the touch-sensitive display moving together, and
   wherein the instructing includes:
   combining the plurality of networked audio players in a single group for coordinated audio playback; and
   synchronizing audio playback from the plurality of networked audio players.

7. The method according to claim 5, wherein the associating includes:
   identifying the detected multi-touch gesture as a splay gesture including multiple points of contact with the touch-sensitive display moving apart, and wherein the instructing includes:
   deleting pre-existing groups, if any, associating one or more of the plurality of networked audio players together for coordinated audio playback; and
   ceasing audio playback from all of the plurality of networked audio players.

8. The method according to claim 5, wherein the displayed representation includes a distinct region of the touch-sensitive display for each of the at least some of the plurality of networked audio players, and wherein a group associating two or more of the at least some of the plurality of networked audio players for coordinated audio playback is indicated by a visually apparent background surrounding only the two or more networked audio players included in the group.

9. A system comprising:
   a plurality of networked audio players each configured to playback audio content according to network-delivered instructions; and
   a controller including a user interface having a touch-sensitive display, wherein the controller is configured to:
   detect a multi-touch gesture involving two or more concurrent points of contact via the touch-sensitive display while the touch-sensitive display portrays a representation of at least some of the plurality of networked audio players;
   associate the detected multi-touch gesture with a gesture-indicated arrangement for audio playback from the plurality of networked audio players;
   instruct the plurality of networked audio players to provide audio playback according to the gesture-indicated arrangement; and
   display a representation of at least some of the plurality of networked audio players including an indication of the gesture-indicated arrangement for coordinated audio playback,
   wherein the data indicative of the multi-touch gesture input comprises data indicative of a splay gesture input that removes the plurality of networked audio players from a group, a pinch gesture input or a squeeze gesture input that groups the plurality of networked audio players into the group.

10. The system according to claim 9, wherein the controller is further configured to:
    responsive to the gesture-indicated arrangement including forming or supplementing one or more groups for coordinated playback, synchronize audio playback from ones of the plurality of networked audio players associated together in the formed or supplemented one or more groups;
    responsive to the gesture-indicated arrangement including removing networked audio players from pre-existing groups, cease playback from ones of the plurality of networked audio players removed from the pre-existing groups.

11. The system according to claim 10, wherein the controller is configured to synchronize audio playback from the first and second networked audio players by synchronously providing a source of audio content, if any, played on the first networked audio player prior to the detection of the gesture.

12. The system according to claim 9, wherein the controller is further configured to:
    identify the detected multi-touch gesture as a squeeze gesture including multiple points of contact with the touch-sensitive display moving together, and wherein the controller instructs the networked audio players by:
    combining the plurality of networked audio players in a single group for coordinated audio playback; and
    synchronizing audio playback from the plurality of networked audio players.

13. A computer readable medium storing instructions that, when executed by one or more processors in a computing device, cause the computing device to perform operations, the operations comprising:
    instructing a touch-sensitive display to portray a representation of at least a portion of a plurality of networked audio players;
    receiving input data indicative of a multi-touch gesture input involving two or more concurrent points of contact via the touch-sensitive display;
    associating the received data with a gesture-indicated arrangement for audio playback from the plurality of networked audio players;
    instructing the plurality of networked audio players to provide audio playback according to the gesture-indicated arrangement; and
    instructing the touch-sensitive display to portray a representation of at least some of the plurality of networked audio players including an indication of the gesture-indicated arrangement,
    wherein the data indicative of the multi-touch gesture input comprises data indicative of a splay gesture input that removes the plurality of networked audio players from a group, and a pinch gesture input or a squeeze gesture input that groups the plurality of networked audio players into the group.

14. The computer readable medium according to claim 13, wherein the instructing the touch-sensitive display is carried out such that representations of at least a portion of the plurality of networked audio players are substantially continuously portrayed via the touch-sensitive display during the receiving input data, the associating the received data with a gesture-indicated arrangement, and the instructing the plurality of networked audio players.

15. The computer readable medium according to claim 13, wherein the operations further comprise:
  responsive to the gesture-indicated arrangement including forming or supplementing one or more groups for coordinated playback, synchronizing audio playback from ones of the plurality of networked audio players associated together in the formed or supplemented one or more groups; and
  responsive to the gesture-indicated arrangement including removing networked audio players from pre-existing groups, ceasing playback from ones of the plurality of networked audio players removed from the pre-existing groups.

* * * * *